(12) United States Patent
Hersman et al.

(10) Patent No.: US 9,653,869 B1
(45) Date of Patent: May 16, 2017

(54) OPTICAL SURFACE PRESERVATION TECHNIQUES AND APPARATUS

(71) Applicant: Xemed LLC, Durham, NH (US)

(72) Inventors: F. William Hersman, Durham, NH (US); David W. Watt, Exeter, NH (US)

(73) Assignee: University of New Hampshire, Durham, NH (US)

( * ) Notice: Subject to any disclaimer, the term of this patent is extended or adjusted under 35 U.S.C. 154(b) by 1085 days.

(21) Appl. No.: 14/063,727

(22) Filed: Oct. 25, 2013

Related U.S. Application Data

(60) Provisional application No. 61/730,443, filed on Nov. 27, 2012, provisional application No. 61/718,909, filed on Oct. 26, 2012.

(51) Int. Cl.
| | |
|---|---|
| *H01S 3/03* | (2006.01) |
| *H01S 3/227* | (2006.01) |
| *H01S 3/0941* | (2006.01) |
| *H01S 3/22* | (2006.01) |
| *H01S 3/034* | (2006.01) |
| *H01S 3/036* | (2006.01) |

(52) U.S. Cl.
CPC .............. *H01S 3/031* (2013.01); *H01S 3/036* (2013.01); *H01S 3/0346* (2013.01); *H01S 3/0941* (2013.01); *H01S 3/22* (2013.01); *H01S 3/227* (2013.01)

(58) Field of Classification Search
CPC ........ H01S 3/031; H01S 3/036; H01S 3/0346; H01S 3/22; H01S 3/227
See application file for complete search history.

(56) References Cited

U.S. PATENT DOCUMENTS

| | | | |
|---|---|---|---|
| 3,706,050 A | * 12/1972 | Cason ................... | H01S 3/0979 372/37 |
| 2004/0125850 A1 | 7/2004 | Hayashikawa et al. | |
| 2009/0022201 A1 | 1/2009 | Krupke et al. | |
| 2012/0087092 A1 | 4/2012 | Huber et al. | |

(Continued)

OTHER PUBLICATIONS

A.V. Bogachev et al., "Diode-pumped caesium vapour laser with closed-cycle laser-active medium circulation," IOPScience 2012, Quantum Electronics vol. 42, No. 2, pp. 95-98.

*Primary Examiner* — Dung Nguyen
(74) *Attorney, Agent, or Firm* — Finch & Maloney PLLC

(57) ABSTRACT

Techniques and architecture are disclosed for preserving optical surfaces (e.g., windows, coatings, etc.) in a flowing gas amplifier laser system, such as a diode-pumped alkali laser (DPAL) system. In some instances, the disclosed techniques/architecture can be used, for example, to protect optical surfaces in a DPAL system from: (1) chemical attack by pump-bleached alkali vapor atoms and/or ions; and/or (2) fouling by adherence thereto of reaction products/soot produced in the DPAL. Also, in some instances, the disclosed techniques/architecture can be used to substantially match the geometry of the pumping volume with that of the lasing volume, thereby minimizing or otherwise reducing the effects of amplified spontaneous emission (ASE) on DPAL output power. Furthermore, in some cases, the disclosed techniques/architecture can be used to provide a DPAL system capable of producing a beam output power in the range of about 20 kW to 10 MW, or greater.

11 Claims, 12 Drawing Sheets

(56) References Cited

U.S. PATENT DOCUMENTS

2014/0023100 A1* 1/2014 Zweiback ............... H01S 3/041
372/34
2014/0133514 A1* 5/2014 Krupke ................... H01S 3/031
372/56

* cited by examiner

Figure 1
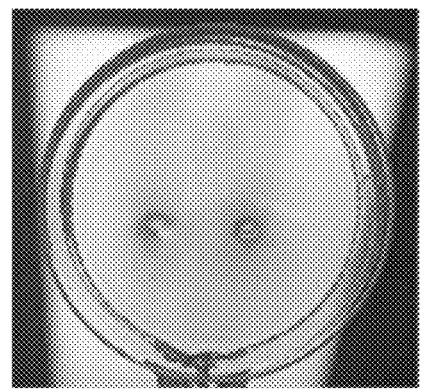
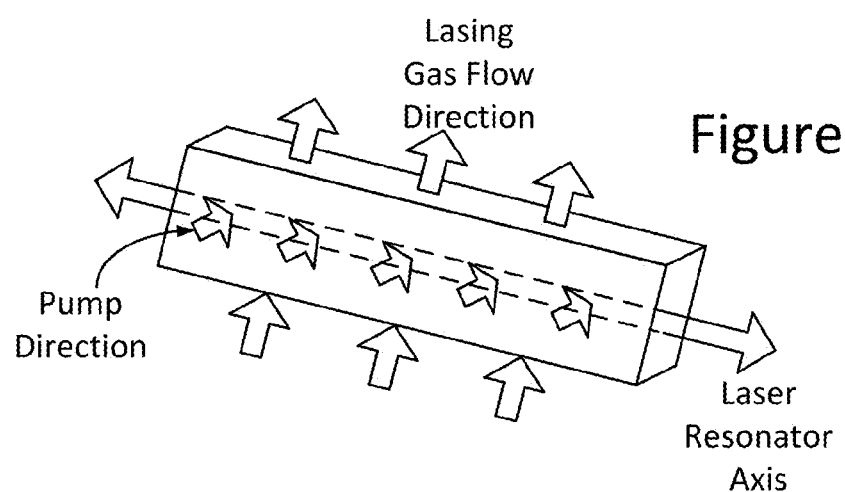
Figure 2A
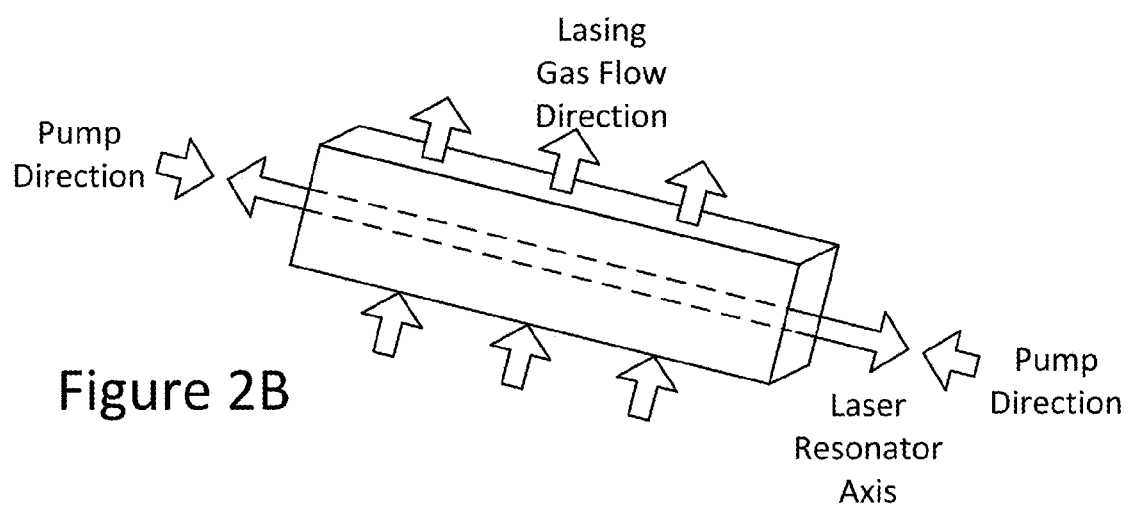
Figure 2B

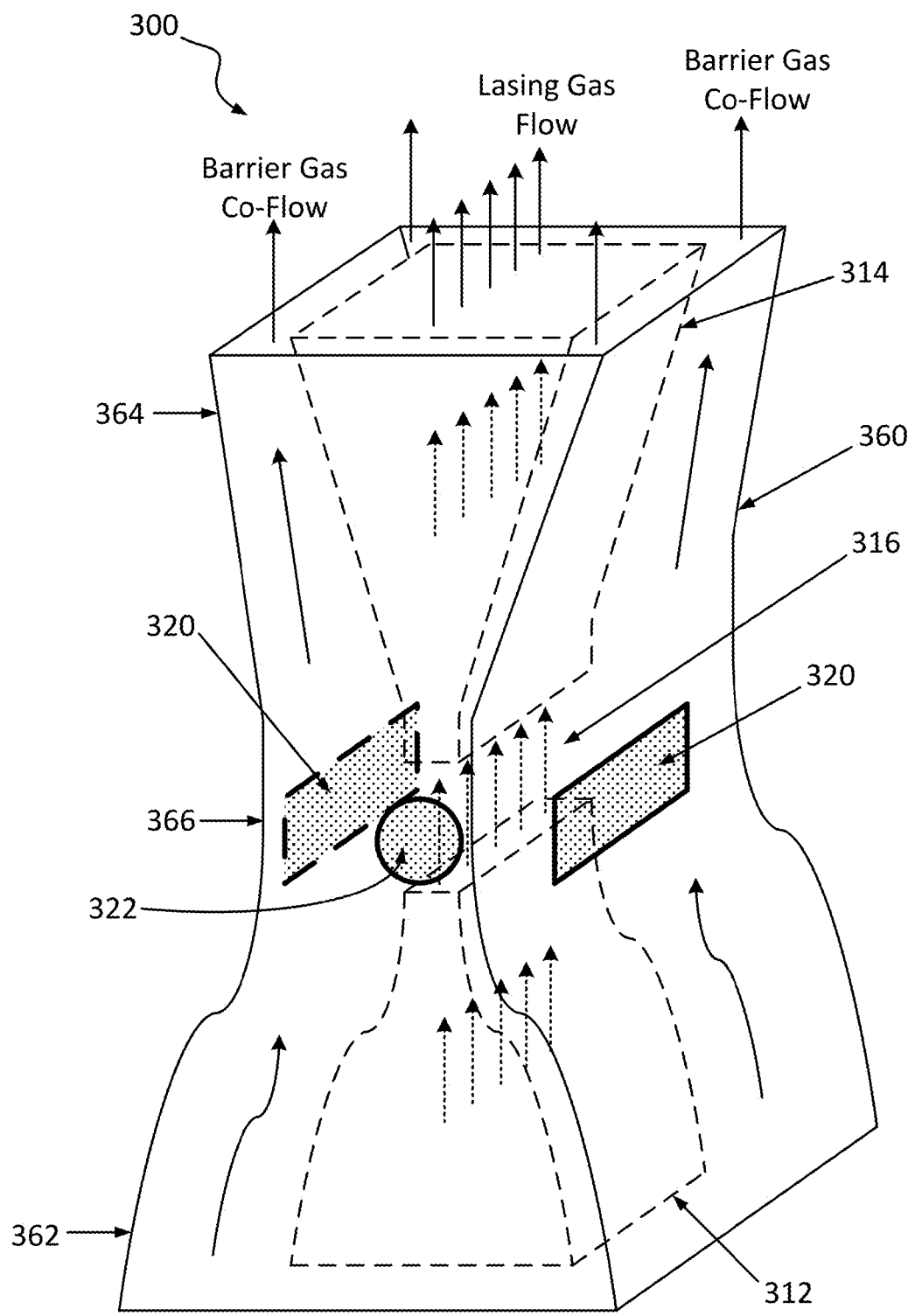

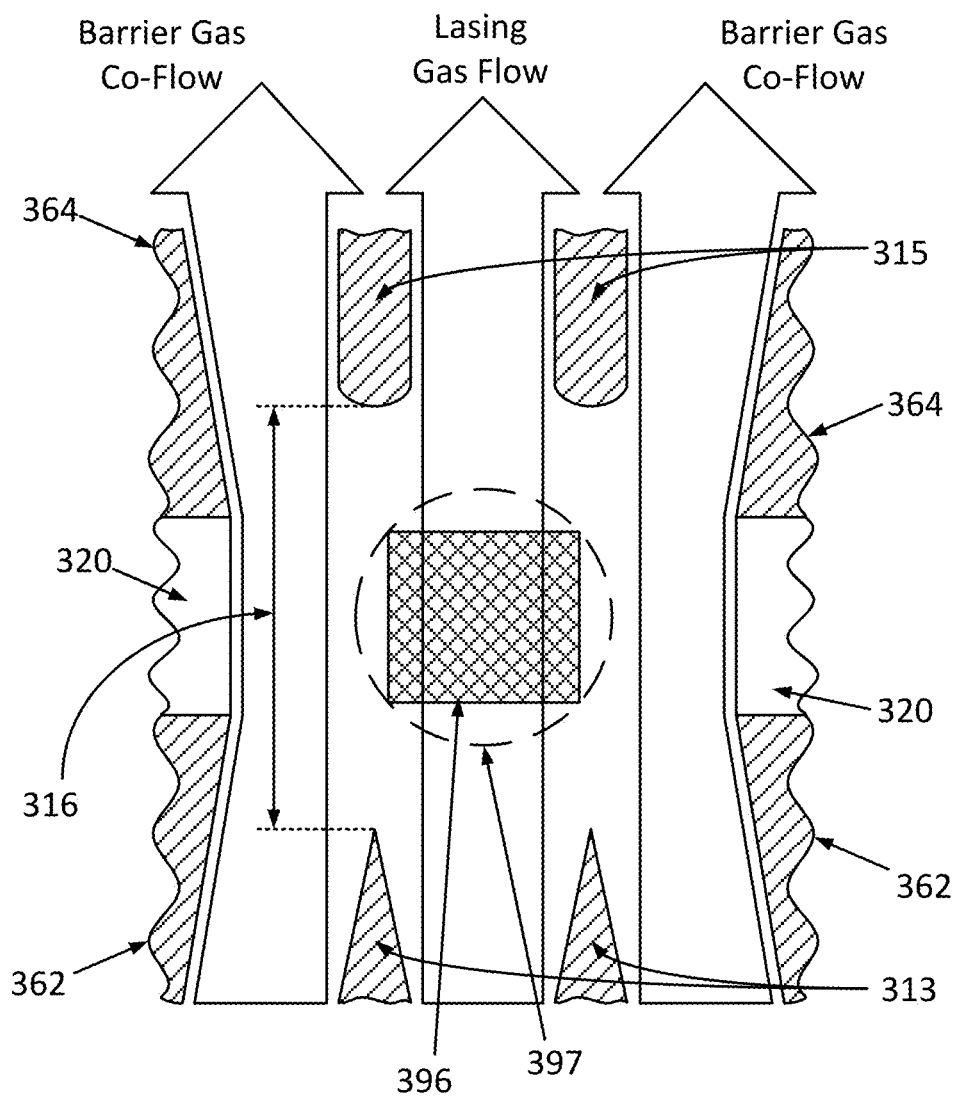

OPTICAL SURFACE PRESERVATION TECHNIQUES AND APPARATUS

CROSS-REFERENCE TO RELATED APPLICATIONS

This Application claims the benefit of U.S. Provisional Patent Application No. 61/718,909, filed on Oct. 26, 2012, and U.S. Provisional Patent Application No. 61/730,443, filed on Nov. 27, 2012, each of which is herein incorporated by reference in its entirety.

FIELD OF THE DISCLOSURE

This disclosure relates to laser systems and more particularly to flowing gas amplifier laser systems.

BACKGROUND

Laser systems involve a number of non-trivial challenges, and laser systems which utilize gaseous lasing media have faced particular complications, such as those with respect to preserving optical surfaces implemented therein.

SUMMARY

One example embodiment of the present invention provides a diode-pumped alkali laser (DPAL) including an optical surface, a flow of a lasing gas, wherein the lasing gas includes alkali vapor, and a flow of a first non-alkali gas flowing between the optical surface and the flow of the lasing gas. In some cases, the flow of the first non-alkali gas forms a protective layer along the optical surface to prevent or minimize at least one of chemical attack thereto and/or soot buildup thereon. In some instances, the first non-alkali gas comprises at least one of an inert gas, a noble gas, a hydrocarbon, a fluorocarbon, and/or a combination of any thereof. In some cases, the DPAL further includes a flow of a second non-alkali gas flowing between the optical surface and the flow of the first non-alkali gas. In some such cases, the flow of the second non-alkali gas forms a protective layer along the optical surface to prevent or minimize at least one of chemical attack thereto and/or soot buildup thereon. In some other such cases, the second non-alkali gas comprises at least one of an inert gas, a noble gas, a hydrocarbon, a fluorocarbon, and/or a combination of any thereof. In any of the aforementioned cases, the alkali vapor can comprise at least one of rubidium (Rb), cesium (Cs), and/or potassium (K). In any of the aforementioned cases, the optical surface can comprise an optical window. In any of the aforementioned cases, the optical surface can comprise a mirror. In some such cases, the optical surface further comprises an optical coating.

Another example embodiment of the present invention provides a system including a diode-pumped alkali laser (DPAL) having an optical pumping cavity and a diffusive/convective end window assembly optically coupled with the optical pumping cavity, the assembly including a tube having a first end, a second end located opposite the first end, and a channel defined between the first and second ends, wherein the first end is configured to be optically coupled with the optical pumping cavity, an optical window at the second end of the tube, and one or more gas injectors operatively coupled to the tube for delivering a flow of a non-alkali gas to the channel. In some cases, the flow of the non-alkali gas forms a protective layer along the optical window to prevent or minimize at least one of chemical attack thereto and/or soot buildup thereon. In some cases, the flow of the non-alkali gas traverses a length of the channel in about 0.1-5 seconds. In some instances, the system further includes a gas circulation system fluidly coupled with the diffusive/convective end window assembly and configured to deliver the flow of the non-alkali gas to the one or more gas injectors. In some instances, the optical window comprises at least one of fused silica and/or sapphire. In some example cases, the optical window is perpendicular relative to the channel. In some other example cases, the optical window is angled at Brewster's angle relative to the channel. In some instances, the DPAL utilizes at least one of a rubidium (Rb)-based, cesium (Cs)-based, and/or potassium (K)-based lasing gas. In some such instances, the non-alkali gas is the same as a carrier gas for the lasing gas. In any of the aforementioned cases, the non-alkali gas can comprise at least one of an inert gas, a noble gas, a hydrocarbon, a fluorocarbon, and/or a combination of any thereof. In any of the aforementioned cases, the DPAL can have an output power in the range of about 20 kW to 10 MW. In any of the aforementioned cases, the system can be operatively coupled with at least one of a land vehicle, a watercraft, an aircraft, a spacecraft, a building, and/or a bunker.

Another example embodiment of the present invention provides a system including a diode-pumped alkali laser (DPAL) having an optical pumping cavity and a side window assembly optically coupled with the optical pumping cavity, the assembly including a recess including an optical window and one or more gas injectors operatively coupled to the recess for delivering a flow of a non-alkali gas to the recess. In some cases, the flow of the non-alkali gas forms a protective layer along the optical window to prevent or minimize at least one of chemical attack thereto and/or soot buildup thereon. In some cases, the flow of the non-alkali gas has a flow rate in the range of about 0.1-5 cm/s. In some instances, the system further includes a gas circulation system fluidly coupled with the side window assembly and configured to deliver the flow of the non-alkali gas to the one or more gas injectors. In some cases, the optical window comprises at least one of fused silica and/or sapphire. In some instances, the DPAL utilizes at least one of a rubidium (Rb)-based, cesium (Cs)-based, and/or potassium (K)-based lasing gas. In some such instances, the non-alkali gas is the same as a carrier gas for the lasing gas. In any of the aforementioned cases, the non-alkali gas can comprise at least one of an inert gas, a noble gas, a hydrocarbon, a fluorocarbon, and/or a combination of any thereof. In any of the aforementioned cases, the DPAL can have an output power in the range of about 20 kW to 10 MW. In any of the aforementioned cases, the system can be operatively coupled with at least one of a land vehicle, a watercraft, an aircraft, a spacecraft, a building, and/or a bunker.

Another example embodiment of the present invention provides a system including a diode-pumped alkali laser (DPAL) having an optical pumping cavity and a flow assembly optically coupled with the optical pumping cavity, the flow assembly including a first conduit having a nozzle portion, a diffuser portion, and a gap there between, wherein the first conduit is configured to deliver a flow of a lasing gas to the optical pumping cavity, and a second conduit surrounding the first conduit, wherein the second conduit is configured to deliver a flow of a first non-alkali gas to the optical pumping cavity, wherein the flow of the first non-alkali gas circumscribes the flow of the lasing gas. In some cases, the second conduit has an optical window disposed therein, and the flow of the first non-alkali gas forms a protective layer along the optical window to prevent or minimize at least one of chemical attack thereto and/or soot buildup thereon. In some such cases, the optical window comprises at least one of fused silica and/or sapphire. In some instances, the first non-alkali gas comprises at least one of an inert gas, a noble gas, a hydrocarbon, a fluorocarbon, and/or a combination of any thereof. In some instances, the system further includes a gas circulation system fluidly coupled with the flow assembly and configured to deliver the flow of the lasing gas to the first conduit and the flow of the first non-alkali gas to the second conduit. In some cases, the system further includes a housing surrounding the second and first conduits, wherein the housing has an optical window disposed therein and is configured to deliver a flow of a second non-alkali gas which surrounds the flow of the first non-alkali gas, and wherein the flow of the second non-alkali gas forms a protective layer along the optical window to prevent or minimize at least one of chemical attack thereto and/or soot buildup thereon. In some such cases, the optical window comprises at least one of fused silica and/or sapphire. In some such cases, the second non-alkali gas comprises at least one of an inert gas, a noble gas, a hydrocarbon, a fluorocarbon, and/or a combination of any thereof. In some such instances, the system further includes a gas circulation system fluidly coupled with the flow assembly and configured to deliver the flow of the lasing gas to the first conduit, the flow of the first non-alkali gas to the second conduit, and the flow of the second non-alkali gas to the housing. In some of the aforementioned cases, the optical pumping cavity can include a stable optical resonator. In some other of the aforementioned cases, the optical pumping cavity can include an unstable optical resonator. In any of the aforementioned cases, the nozzle portion can include an exit through which the flow of the lasing gas passes to enter the optical pumping cavity. In some such cases, the exit of the nozzle portion has at least one dimension in the range of about 1-10 mm. In some other such cases, the exit of the nozzle portion has at least one dimension in the range of about 1-10 cm. In any of the aforementioned cases, the flow of the lasing gas can have a flow velocity in the range of about 50-1000 m/s. In any of the aforementioned cases, the flow of the lasing gas and the flow of the first non-alkali gas can have approximately equal flow velocities. In any of the aforementioned cases, the DPAL can utilize at least one of a rubidium (Rb)-based, cesium (Cs)-based, and/or potassium (K)-based lasing gas. In some such instances, the first non-alkali gas is the same as a carrier gas for the lasing gas. In any of the aforementioned cases, the DPAL can have an output power in the range of about 20 kW to 10 MW. In any of the aforementioned cases, the system can be operatively coupled with at least one of a land vehicle, a watercraft, an aircraft, a spacecraft, a building, and/or a bunker.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

BRIEF DESCRIPTION OF THE DRAWINGS

FIG. 1 illustrates a damaged window of a cesium (Cs) cell of an example diode-pumped alkali laser (DPAL) system.

FIG. 2A represents an example side-pumped DPAL lasing cavity.

FIG. 2B represents an example end-pumped DPAL lasing cavity.

FIG. 5A is a side perspective view of a flush side window assembly configured in accordance with an embodiment of the present invention.

FIG. 6A is a partial cross-sectional view of a flush side window assembly configured in accordance with an embodiment of the present invention.

Figure 3:
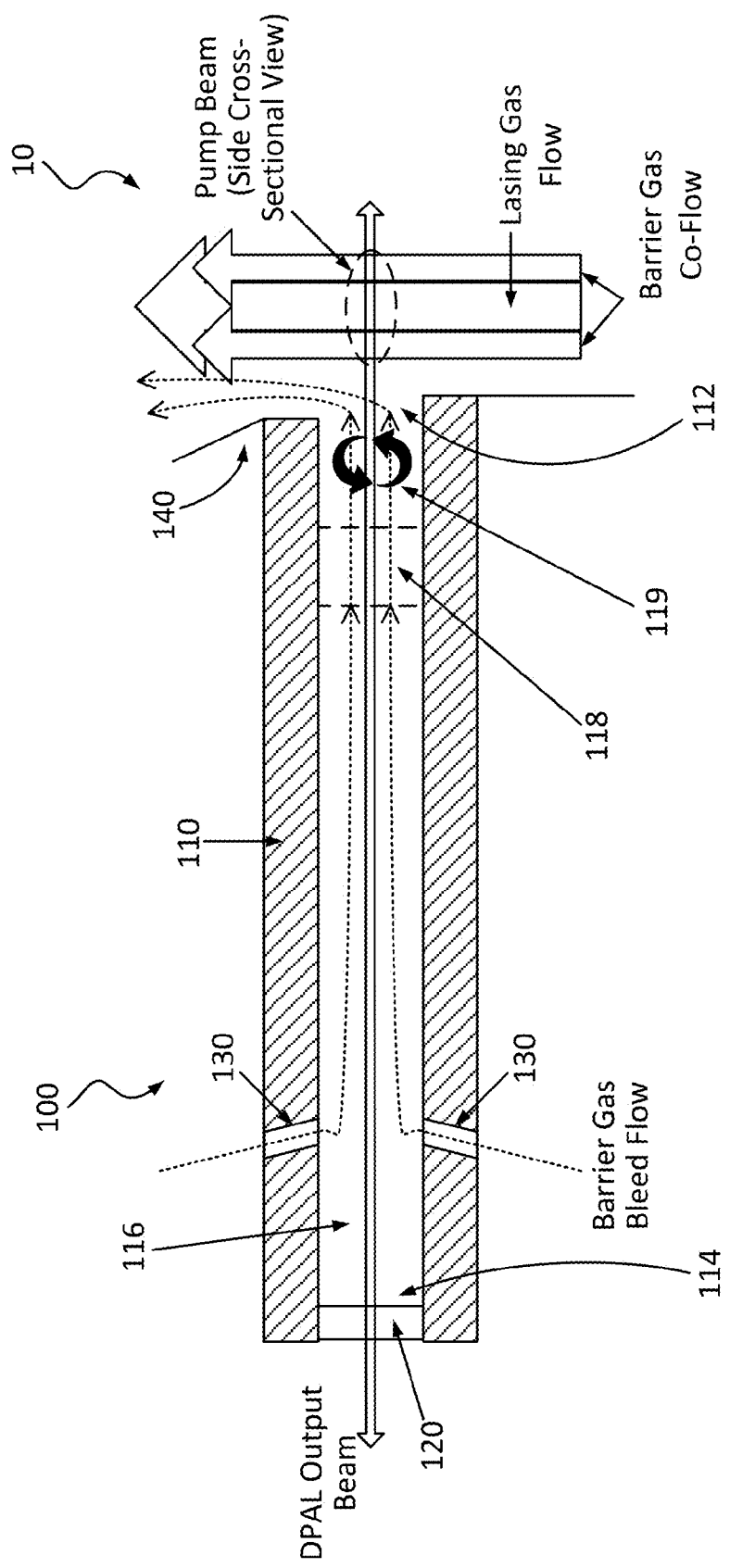
FIG. 3 is a side cross-sectional view of an end window assembly configured in accordance with an embodiment of the present invention.

These and other features of the present embodiments will be understood better by reading the following detailed description, taken together with the figures herein described. The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

Techniques and architecture are disclosed for preserving optical surfaces (e.g., windows, coatings, etc.) in a flowing gas amplifier laser system, such as a diode-pumped alkali laser (DPAL) system. In some instances, the disclosed techniques/architecture can be used, for example, to protect optical surfaces in a DPAL system from: (1) chemical attack by pump-bleached alkali vapor atoms and/or ions; and/or (2) fouling by adherence thereto of reaction products/soot produced in the DPAL. Also, in some instances, the disclosed techniques/architecture can be used to substantially match the geometry of the pumping volume with that of the lasing volume, thereby minimizing or otherwise reducing the effects of amplified spontaneous emission (ASE) on DPAL output power. Furthermore, in some cases, the disclosed techniques/architecture can be used to provide a DPAL system capable of producing a beam output power in the range of about 20 kW to 10 MW, or greater. Numerous configurations and variations will be apparent in light of this disclosure.

General Overview

As previously indicated, there are a number of non-trivial issues that can arise which complicate laser systems which utilize gaseous lasing media. For instance, in the example context of alkali vapor laser systems (e.g., such as a diode-pumped alkali laser, or DPAL, system), one non-trivial issue pertains to the fact that alkali atoms (e.g., rubidium, cesium, potassium, etc.) present in the gain medium may be optically pumped into one or more excited states and/or become ionized, for example, by the pump laser and/or by the output beam and in turn cause damage to the optical surfaces (e.g., windows, coatings, etc.) with which they come in contact (e.g., attack the surface coatings of the optical windows where the pump and output laser beams pass through). Another example complication is that, within DPAL systems which utilize hydrocarbons in the gas mixture, reaction products (soot) may be generated from chemical reactions within the DPAL lasing cavity. These soot particles can adhere to windows and other optical surfaces, absorb energy, and degrade the coatings thereon (e.g., localized heating may cause etching).

As will be appreciated in light of this disclosure, these example complications can occur with any of a wide range of gas amplifier media and regardless of whether the DPAL is flowing or static, end-pumped or side-pumped. To demonstrate this point, consider FIG. 1, for example, which illustrates a damaged window of a cesium (Cs) cell of an example DPAL system after operation thereof at temperatures in excess of 120° C. As will be further appreciated in light of this disclosure, attempts at increasing the output power of existing DPAL systems, for example, to achieve continuous-wave (CW) operation at power output levels higher than 10 W will worsen the damage done to the DPAL optical components (e.g., windows, coatings, etc.), substantially decreasing the service lifetime of such components and thus negatively impacting the ability to achieve such CW operation.

Yet another non-trivial issue pertains to the fact that, when the population inversion in a given regional sub-volume of a DPAL system is just above threshold, alkali atoms which have been pumped by the pump laser but which have not been stimulated immediately to cause emission (i.e., which do not lie within a regional sub-volume that is illuminated within an intense mode, such as the fundamental transverse mode ($TEM_{00}$ mode), of the output beam of such system) may spontaneously emit photons, which can lead to amplified spontaneous emission (ASE). ASE saps power from the DPAL output beam and generates a significant amount of heat, consequently reducing the overall optical-to-optical efficiency of the system and imposing constraints on the output power achievable with a given DPAL system. These and other non-trivial issues prevent existing DPAL designs/approaches from achieving high-power, continuous operation.

Some laser systems (e.g., a DPAL) may utilize a lasing gas which is flowed, for example, to provide for a desired amount of heat removal for a given target application. For instance, a flowing lasing gas may be utilized in: (1) transversely pumped (e.g., side-pumped) DPAL lasing cavities, such as the example shown in FIG. 2A, which may be pumped from one or multiple sides; and/or (2) end-pumped DPAL lasing cavities, such as the example shown in FIG. 2B, which may be pumped from one or multiple ends. As will be appreciated in light of this disclosure, and in accordance with an embodiment, the fluid motion of the lasing gas provides an opportunity for use thereof in establishing and/or maintaining a DPAL lasing medium and removing heat therefrom while protecting/preserving the optical integrity of various optical surfaces (e.g., windows, coatings, etc.) which may be present in a given DPAL.

Thus, and in accordance with one set of embodiments, techniques and architecture are disclosed for preserving optical surfaces in a laser system which utilizes a flowing gaseous lasing medium, such as a diode-pumped alkali laser (DPAL) system. The disclosed techniques/architecture can be used, in accordance with an embodiment, in side-pumped (e.g., transversely pumped from one or more sides thereof) and/or end-pumped DPALs (e.g., pumped from one or more ends thereof). Also, the disclosed techniques/architecture can be used, in accordance with an embodiment, in a DPAL system which utilizes, for example, a flowing alkali-based lasing gas, such as, but not limited to: (1) a rubidium (Rb)-based lasing gas; (2) a cesium (Cs)-based lasing gas; and/or (3) a potassium (K)-based lasing gas. Other suitable uses and/or laser system configurations for the disclosed techniques/architecture will be apparent in light of this disclosure.

In accordance with an embodiment, the disclosed techniques/architecture can be used to provide a flowing fluid barrier layer which is substantially free of alkali vapor (e.g., a non-alkali gaseous barrier) and which isolates, in part or in whole, the lasing medium (e.g., alkali vapor-saturated lasing gas) from the optical surfaces (e.g., windows, coatings, etc.) of a given DPAL. The disclosed techniques/architecture can be used, in accordance with an embodiment, to protect optical surfaces in a DPAL system (or other laser system which utilizes a flowing gaseous amplifier medium) from: (1) chemical attack by pump-bleached alkali vapor atoms and/or ions; and/or (2) fouling by adherence thereto of reaction products/soot produced in the DPAL.

In accordance with an embodiment, the gaseous barrier layer may be provided, for example: (1) as a bleed flow which prevents or otherwise reduces migration of the lasing gas to a given DPAL optical surface; and/or (2) as a co-flowing stream/jet which circumscribes/envelops, and thus confines, the lasing gas, preventing or otherwise reducing migration of the lasing gas to a given DPAL optical surface. In some instances, and in accordance with an embodiment, a bleed flow of barrier gas and a co-flowing stream/jet of barrier gas may be provided/utilized simultaneously within a given DPAL system. In some embodiments, such a gaseous barrier layer can be provided in a continually replenished manner and, as such, may be substantially indestructible and/or non-fouling, thus allowing for indefinitely preserving the optical quality of a given optical surface. In some cases, and in accordance with an embodiment, a solid barrier layer (e.g., a hard coating on an optical window or other surface) may be implemented in conjunction with a gaseous barrier layer provided as described herein, for example, to further assist with protecting a given DPAL optical surface.

As will be appreciated in light of this disclosure, and in accordance with an embodiment, it may be desirable to ensure that the one or more gases which constitute the gaseous barrier layer are substantially transparent (e.g., fully or otherwise within an acceptable tolerance) to minimally or otherwise negligibly interfere with the optical pumping (e.g., by a pump laser or other suitable source) of the lasing gas. As will be further appreciated, it may be desirable to ensure that the flow of the gaseous barrier layer (e.g., bleed flow and/or co-flow) minimally or otherwise negligibly: (1)

disturbs the pumping region; and/or (2) results in refractive lensing of the DPAL output beam. Still further, it may be desirable to provide a gaseous barrier layer which has been conditioned, for example, to minimize or otherwise reduce temperature variations therein.

The disclosed techniques/architecture may be compatible with a wide variety of optical surfaces. For example, some embodiments can be used with DPAL systems that implement fused silica and/or sapphire windows. Furthermore, some embodiments can be used with DPAL optics which are provided with one or more optical and/or protective coatings (e.g., high-transmission coatings; high-reflectivity coatings; nanotextured surfaces; etc.).

Also, the disclosed techniques/architecture may be compatible with a wide variety of gases which may be used in the non-alkali gaseous barrier layer. Some example suitable gases include, but are not limited to: (1) inert gases (e.g., elemental gas, compound gas, etc.); (2) noble gases, such as helium (He) and/or isotopes thereof, such as helium-4 ($^4$He), helium-3 ($^3$He), etc.; (3) hydrocarbons, such as methane ($CH_4$), ethane ($C_2H_6$), etc.; (4) fluorocarbons; (5) a combination of any of the aforementioned; and/or (6) any other suitable gas or gaseous mixture which can provide the desired thermal management performance and/or assist with the desired spin-orbit atomic transitions for the lasing gas, as will be apparent in light of this disclosure.

Furthermore, the disclosed techniques/architecture may be compatible with a wide variety of optical pumping sources and/or methods, in accordance with an embodiment. For instance, some embodiments of the present invention may be compatible with optical pumping provided by one or more laser diodes (e.g., laser diode bars, stacks, arrays, etc.). Some embodiments may be compatible with adjustments to the pump beam geometry (e.g., converging pump beam; adjusted Gaussian waist diameter; etc.). Also, some embodiments may be compatible with any of a wide range of optical pumping wavelengths (e.g., 780 nm, etc.) and/or spectral linewidths.

As discussed below, some embodiments of the present invention may realize improved output power, for example, by reducing efficiency losses in power from amplified spontaneous emission (ASE), thereby improving the optical-to-optical efficiency of a given DPAL system. In some example cases, optical-to-optical efficiency may be improved to be in the range of about 40-80% or greater (e.g., about 40% or greater; about 50% or greater; about 60% or greater; about 70% or greater; about 80% or greater; etc.). In some such instances, a sufficiently high optical-to-optical efficiency may be achieved, for example, to provide a DPAL system which is capable of having a beam output power in the range of about 20 kW to 10 MW, or greater. Other achievable performance characteristics/ranges will be apparent in light of this disclosure.

As will be appreciated in light of this disclosure, some embodiments of the present invention may realize benefits/advantages as compared with existing approaches/designs. For example, as previously noted, some embodiments of the present invention may realize an increase in the service lifetime of a given DPAL optical component as compared with existing approaches/designs. Also, some embodiments may eliminate or otherwise reduce the need to implement, in a given DPAL, optical surfaces (e.g., windows, coatings, etc.) which have been specifically designed, for instance, to tolerate sustained exposure to alkali vapor which has been excited by high laser fluxes (e.g., nano-textured sapphire).

As will be further appreciated in light of this disclosure, some embodiments of the present invention may be used to provide a DPAL system having optical componentry which exhibits an improved/enhanced service lifetime and which is compatible with high-power (e.g., kilowatt- and/or megawatt-class), continuous-wave (CW) DPAL operation. Such a DPAL system may be utilized, in accordance with one or more embodiments, in any of a wide variety of applications, such as, but not limited to: (1) welding and metal cutting; (2) mining; (3) medical procedures; (4) directed energy weapons (DEWs) and countermeasures; (5) deorbiting space debris; and/or (6) any other directed energy application (e.g., transmitting energy to a deep-space probe). In some instances, and in accordance with an embodiment, a DPAL system provided using the disclosed techniques/architecture can be configured, for example, to be deployed on a vehicle (e.g., land vehicle, watercraft, aircraft, spacecraft, etc.), an infrastructure (e.g., building, bunker, etc.), and/or any other desired platform, temporary or permanent. Other suitable uses will be apparent in light of this disclosure.

As used herein, the term "lasing gas" generally may refer to a gas or gas mixture including, for example: (1) a vapor of alkali metal, such as rubidium (Rb), cesium (Cs), potassium (K), etc., having a density in the range of about $1\times10^{11}/cm^3$ to $1\times10^{16}/cm^3$; (2) a buffer gas which pressure-broadens the absorption lines of the alkali atom with absolute pressure in the range of about 150-15,000 torr; and/or (3) a gas to accelerate the atomic spin-orbit transition from the pump level to the lasing level, which may be the aforementioned buffer gas or one or more other gases. Also, as used herein, the term "non-alkali gas" generally may refer to a gas or gas mixture including, for example, a buffer gas and/or an atomic spin-orbit transition gas (like those discussed above regarding the lasing gas), but which is devoid of alkali vapor or which has a minimal or otherwise negligible amount of alkali vapor (e.g., the alkali vapor has been removed to as low a level as is practical or otherwise desirable). It should be noted, however, that the claimed invention is not intended to be limited to only these example lasing gases and non-alkali gases. Rather, any gas or gas mixture having qualities described herein may be suitable to serve as a lasing gas and/or non-alkali gas. Numerous configurations will be apparent in light of this disclosure.

Bleed Flow Techniques and End Window Assembly

As previously noted, and in accordance with an embodiment, the disclosed techniques/architecture can be used to provide a bleed flow of a non-alkali gas (or gas mixture) which provides a gaseous barrier layer. In some cases, such a bleed flow can be used, for example, to continuously purge a given window or other optical surface of a DPAL (or other laser system which utilizes a flowing gaseous amplifier medium), thereby providing a diffusive/convective gaseous barrier layer which prevents or otherwise reduces migration of lasing gas to that window/surface. As discussed below, such a gaseous barrier layer may be implemented, for example, to protect a given DPAL lasing cavity end window. As will be appreciated in light of this disclosure, the techniques disclosed herein for protecting a given end window may be utilized, in some embodiments, regardless of: (1) how the DPAL is pumped (e.g., end pumped from one or more ends, side pumped from one or more sides, etc.); (2) whether a co-flow (e.g., such as that discussed below with reference to FIGS. 5A-5B and 6A-6B) is present; and/or (3) end window orientation (e.g., perpendicular to the lasing axis, offset at an angle relative to the lasing axis such as the Brewster's angle, etc.).

In some cases, and in accordance with an embodiment, a DPAL system (or other laser system which utilizes a flowing gaseous amplifier medium) may be provided with structure/ architecture configured to assist with providing such a diffusive/convective gaseous barrier layer. For instance, consider FIG. 3, which is a side cross-sectional view of an end window assembly 100 configured in accordance with an embodiment of the present invention. As can be seen from the depicted example embodiment, end window assembly 100 may include a tube 110 which extends out from the pumping cavity 10 of the DPAL and which may have a channel 116 defined therein. In some cases, an end window 120 can be disposed at an end of tube 110, and the DPAL output beam may be directed therethrough. In some embodiments, end window 120 may be oriented such that its major surfaces (e.g., the surfaces through which the DPAL output beam is to pass) are substantially perpendicular (e.g., exactly or otherwise within a desired variance) to the lasing axis of the DPAL. However, the claimed invention is not so limited, as in some other embodiments, end window 120 may be oriented/offset at an angle relative to the lasing axis (e.g., at or near the Brewster's angle; etc.). Also, tube 110 may be provided with one or more injectors 130 which deliver the gases to one or more locations for providing the gaseous barrier layer to the channel 116 of tube 110. In accordance with an embodiment, lasing cavity end window 120 may be isolated from the alkali-saturated lasing gas (e.g., lasing medium containing Rb vapor, Cs vapor, K vapor, etc.) utilized in the DPAL by virtue of how end window assembly 100 provides a bleed flow of a barrier gas which opposes diffusion of the lasing gas into the channel 116 of tube 110. As will be appreciated in light of this disclosure, end window assembly 100 may include additional, fewer, and/or different elements or components from those here described, and the claimed invention is not intended to be limited to any particular assembly configurations, but can be used with numerous configurations in numerous applications.

In accordance with an embodiment, the geometry of tube 110 may be customized for a given target application. For instance, in some embodiments, tube 110 may be configured as a substantially hollow cylinder having one or more open ends (e.g., an entrance end 112 and an exit end 114). However, the claimed invention is not so limited, as in some other embodiments, tube 110 may be configured as a substantially hollow square/rectangular prism having one or more such open ends 112/114. Other suitable geometries for tube 110 will depend on a given application and will be apparent in light of this disclosure.

In accordance with an embodiment, tube 110 may be dimensioned (e.g., length, width/diameter, etc.) as desired for a given target application. For instance, tube 110 may be provided, in some example embodiments, with a length and/or transverse dimension (width/diameter) in the range of about 1 mm to 10 cm or greater. As will be appreciated in light of this disclosure, it may be desirable to ensure that the length of tube 110 is sufficient to limit the ability of the lasing gas and/or soot particles to migrate from the pumping cavity 10 down the length of tube 110 to end window 120. As will be further appreciated, it may be desirable to ensure that the width/diameter of tube 110 is sufficient to allow passage therethrough of the DPAL output beam (e.g., the transverse dimension of tube 110 is greater than the transverse dimension of the DPAL output beam).

In some cases, tube 110 may be configured such that its length-to-width/diameter ratio is sufficiently high (e.g., about 5-to-1 or higher), for example, to allow for the use of high lasing gas flow rates (e.g., in the range of about 5-20 cm/s or higher). As will be appreciated in light of this disclosure, and in accordance with an embodiment, such a high ratio may minimize or otherwise reduce any likelihood of the lasing gas and/or soot particles migrating down the length of tube 110 to reach window 120, regardless of any turbulence which might result at entrance end 112 from the high lasing gas flow rate. Thus, in some such instances, the flow rate of the barrier gas bleed flow may be reduced with minimal or otherwise negligible risk of damage to end window 120. However, the claimed invention is not so limited, as tube 110 may be configured, in some other cases, with lower length-to-width/diameter ratios (e.g., less than about 5-to-1). It should be noted, however, that with some lower ratios (e.g., about 2-to-1 or lower), it may be desirable to ensure that: (1) the flow rate of the barrier gas bleed flow is not reduced excessively; and/or (2) an aerodynamic adjustment 140 (discussed below) for turbulence in pumping region 10 is made. Other suitable dimensions (e.g., lengths, widths/diameters, ratios, etc.) for tube 110 will depend on a given application and will be apparent in light of this disclosure.

In accordance with an embodiment, the geometry of channel 116 may be customized for a given target application. For instance, in some embodiments, channel 116 may be configured with a substantially rectilinear geometry. However, the claimed invention is not so limited, as in some other embodiments, channel 116 may be provided with a substantially curvilinear geometry. As will be appreciated in light of this disclosure, and in accordance with an embodiment, the geometry of channel 116 may depend, in part or in whole, on the geometry and/or dimensions of the DPAL output beam. Other suitable geometries for channel 116 will depend on a given application and will be apparent in light of this disclosure.

In accordance with an embodiment, the dimensions (e.g., length, width/diameter, etc.) of channel 116 may be customized for a given target application. For instance, in some embodiments, channel 116 may be provided with a length that substantially matches that of tube 110 (e.g., channel 116 extends from entrance end 112 to exit end 114). In some cases, channel 116 may be configured such that one portion thereof is longer than another portion thereof (e.g., as discussed below in the context of aerodynamic adjustment 140). Also, in some embodiments, channel 116 may be provided with a width/diameter that is sufficient (e.g., just sufficient or otherwise within a given tolerance) to allow passage therethrough of the DPAL output beam. For example, channel 116 may have a width/diameter, in some cases, in the range of about 1 mm to 5 cm or greater. As will be appreciated in light of this disclosure, and in accordance with an embodiment, provision of a narrow channel 116 (e.g., having a width/diameter in the range of about 1-5 mm) may be desirable, for example, for relatively low to modest power applications, while provision of a wider channel 116 (e.g., having a width/diameter in the range of about 1-5 cm or greater) may be desirable for relatively higher power applications. Other suitable dimensions (e.g., lengths, widths/diameters, etc.) for channel 116 will depend on a given application and will be apparent in light of this disclosure.

As previously noted, end window assembly 100 may include one or more injectors 130 configured to deliver one or more gases to provide the gaseous barrier layer in the interior (e.g., channel 116) of tube 110. As can be seen from FIG. 3, the one or more injectors 116 may be operatively coupled with tube 110 proximate exit end 114 thereof. By virtue of such placement, the barrier gas bleed flow may be delivered within channel 116 proximate end window 120 and thus, in accordance with an embodiment, may help to minimize or otherwise reduce the ability of the lasing gas atoms/molecules and/or soot particles to migrate from the pumping cavity 10 down the length of tube 110 to contact end window 120.

In accordance with an embodiment, upon exiting the one or more injectors 130, the barrier gas may flow through channel 116 towards pumping cavity 10. During its transit through channel 116, the barrier gas may pass through a transition region 118. Transition region 118 may define or otherwise provide an interface for the volume of the barrier gas and the volume of the lasing gas. The dimensions and/or relative location of transition region 118 within channel 116 may be made or otherwise permitted to fluctuate depending on, for example: (1) the depth of penetration of the lasing gas flow into channel 116 from the entrance end 112, which may depend on the pressure, velocity, and/or laminarity of the lasing flow, the dimensions of channel 116, and/or the diffusivity of the lasing gas (e.g., depending on gas composition and/or temperature); and/or (2) the flow rate and/or laminarity of the barrier gas bleed flow.

Thereafter, the barrier gas bleed flow may enter a mixing region 119 where it may be mixed with the lasing gas (and/or a co-flowing barrier gas, discussed below) streaming past entrance end 112. Upon mixing with gas from the pumping cavity 10, the barrier gas may be carried downstream (e.g., in the direction generally indicated by the large arrows in FIG. 3). It may be desirable to configure mixing region 119 such that the barrier gas bleed flow exiting entrance end 112 minimally (or otherwise negligibly) disrupts/displaces the lasing gas flow. To that end, and in accordance with an embodiment, computational fluid dynamics software/programming (e.g., ANSYS® Fluent® software) may be used, for example, to determine what geometry of mixing region 119 minimizes or otherwise reduces the disruptive effects of the barrier gas bleed flow on the lasing gas flow and/or buffer gas co-flow in pumping cavity 10.

In some cases, end window assembly 100 may include an aerodynamic adjustment 140. For example, as can be seen from FIG. 3, in some instances, tube 110 may be configured such that the downstream edge thereof at entrance end 112 is laterally offset from the upstream edge thereof and widened/stepped outward relative to pumping cavity 10. In accordance with an embodiment, such aerodynamic adjustment 140 may help, for example, to accommodate the increase in the flow of gas passing through pumping cavity 10 which may result by virtue of the mixed gas being carried downstream. Aerodynamic adjustment 140 may permit the mixed gas to expand downstream of the pumping cavity 10, thus allowing the mixed gas to transition to a wall jet which may be effectively injected parallel to the lasing gas flow, thereby minimally or otherwise negligibly disrupting/displacing the lasing gas flow. In some cases, aerodynamic adjustment 140 may assist, for example, with maintaining the desired transition region 118.

In some cases, it may be desirable to ensure that the temperature of tube 110 is held within a desired range for a given target application. For example, in some cases, it may be desirable to maintain the temperature of tube 110 at room temperature (e.g., to maintain a low vapor pressure of the alkali-saturated lasing gas). Other suitable temperature ranges will depend on a given application and will be apparent in light of this disclosure.

In accordance with an embodiment, it may be desirable to ensure that the barrier gas bleed flow has a sufficiently high flow rate to counter the diffusive flow of the lasing gas and/or to provide a sharp interfacial region (e.g., transition region 118) between the lasing gas volume and the barrier gas volume. However, it also may be desirable to ensure that the flow rate of the barrier gas is not so high that the pumping region 10 experiences flow-induced unsteadiness (e.g., which may undesirably disrupt/displace the lasing gas flow) as a result of the combining of the barrier gas with the lasing gas flow. Otherwise stated, if the flow rate of the barrier gas bleed flow is too high, mixing region 119 may be pushed outside of channel 116 and into pumping region 10, which may induce turbulence, alter alkali concentration, and/or negatively impact laser performance, whereas if the flow rate is too low, the lasing gas may penetrate too deeply into channel 116, pushing transition region 118 closer to end window 120, and thus increasing the likelihood of damage to end window 120. Therefore, in one specific example embodiment, provision of a barrier gas bleed flow having a flow rate in the range of about 0.1-5 cm/s (e.g., about 1 cm/s or less) may be sufficient to provide a substantially stationary transition region 118 having a length (parallel to the lasing axis) comparable to its transverse dimension (width/diameter perpendicular to the lasing axis). Other suitable velocity ranges will depend on a given application and will be apparent in light of this disclosure.

In some embodiments, end window assembly 100 may be operatively coupled (e.g., fluidly coupled) with a gas circulation system 700a, discussed below with reference to FIG. 8A, which is configured to provide the barrier gas bleed flow for injection into end window assembly 100.

Bleed Flow Techniques and Recessed Side Windows

Figure 4A:
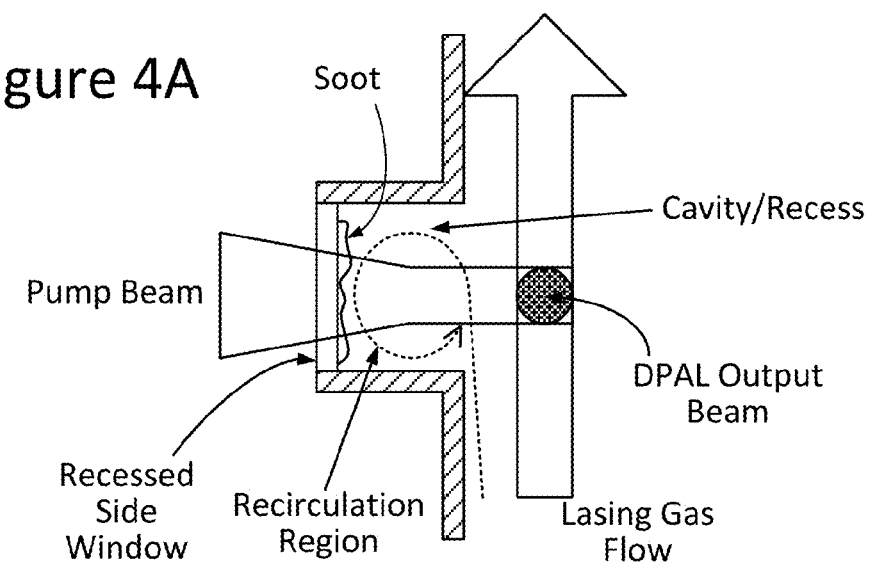
FIG. 4A is a side cross-sectional view of an example DPAL pumping cavity having a recessed side window.

FIG. 4A is a side cross-sectional view of an example DPAL pumping cavity having a recessed side pumping window. When the lasing gas stream flows across the opening of the recess/cavity adjacent the side pumping window, a recirculation zone (generally represented by the curved, dotted line) fills the recess/cavity, resulting in a buildup of soot which contaminates the side pumping window and decreases system performance.

As previously noted, and in accordance with an embodiment, the disclosed techniques/architecture can be used to provide a bleed flow of a non-alkali gas (or gas mixture) which provides a gaseous barrier layer. In some cases, such a bleed flow can be used, for example, to oppose an internal rotating flow, thereby countering the formation of a recirculation zone like that described with reference to FIG. 4A and thus minimizing or otherwise reducing the accumulation of soot on a recessed side window. Also, in some cases, the barrier gas bleed flow may minimize or otherwise reduce the ability of the lasing gas particles to migrate from the pumping region to a given recessed side window. As will be appreciated in light of this disclosure, the techniques disclosed herein for protecting a given recessed side window may be utilized, in some embodiments, regardless of: (1) how the DPAL is pumped (e.g., end pumped from one or more ends, side pumped from one or more sides, etc.); and/or (2) whether a co-flow (e.g., such as that discussed below with reference to FIGS. 5A-5B and 6A-6B) is present.

Figure 4B:
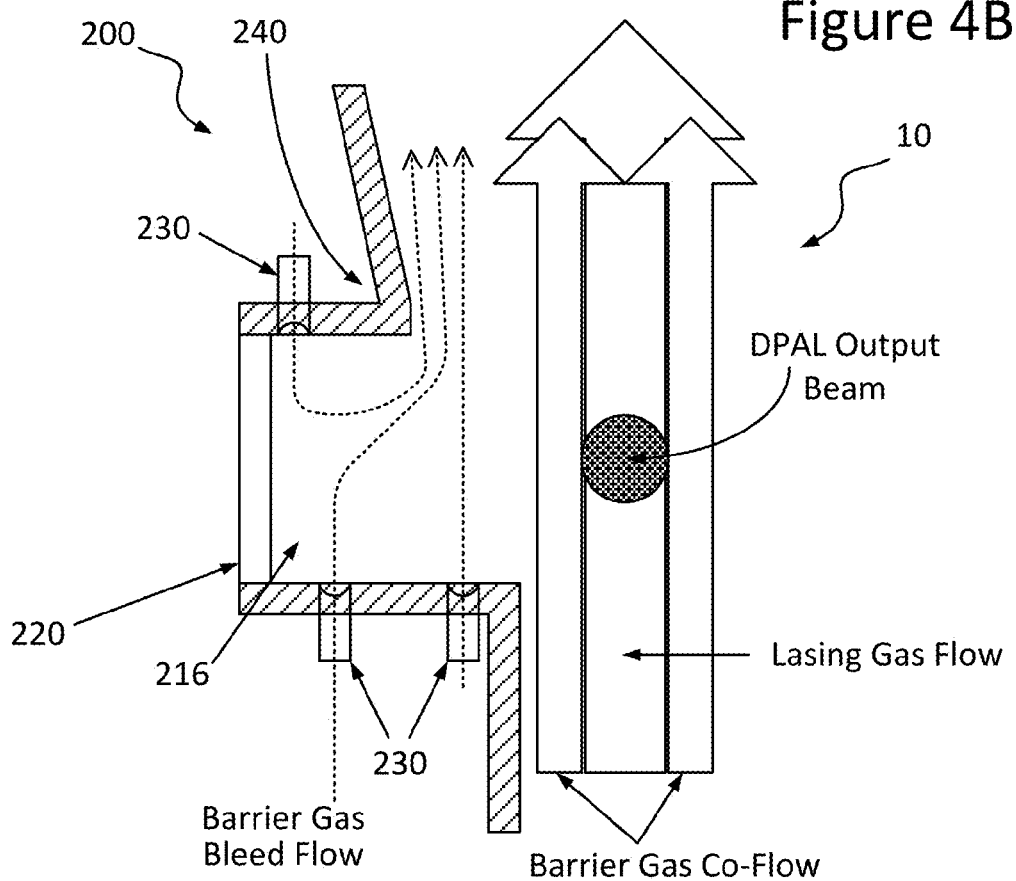
FIG. 4B is a side cross-sectional view of a recessed side window assembly configured in accordance with an embodiment of the present invention.

In some cases, and in accordance with an embodiment, a DPAL system (or other laser system which utilizes a flowing gaseous amplifier medium) may be provided with structure/architecture configured to assist with providing such a gaseous barrier layer. For instance, consider FIG. 4B, which is a side cross-sectional view of a recessed side window assembly 200 configured in accordance with an embodiment of the present invention. As can be seen from the depicted example embodiment, recessed side window assembly 200 may include a cavity/recess 216 which extends from the pumping region 10 of the DPAL, a side window 220 disposed at an end thereof, through which the one or more pump beams may be directed towards the lasing gas flow, and one or more injectors 230 which deliver a barrier gas bleed flow to the cavity/recess 216. In accordance with an embodiment, recessed side window 220 may be isolated from the alkali-saturated lasing gas (e.g., lasing medium containing Rb vapor, Cs vapor, K vapor, etc.) utilized in the DPAL by virtue of how recessed side window assembly 200 provides a barrier gas bleed flow which opposes diffusion and/or recirculation of the lasing gas into cavity/recess 216. As will be appreciated in light of this disclosure, recessed side window assembly 200 may include additional, fewer, and/or different elements or components from those here described, and the claimed invention is not intended to be limited to any particular assembly configurations, but can be used with numerous configurations in numerous applications.

In accordance with an embodiment, the geometry of cavity/recess 216 may be customized for a given target application. For instance, in some embodiments, cavity/recess 216 may be configured with a substantially square/rectangular geometry having one or more open ends (e.g., which may be configured, for example, to have a side window 220 disposed thereat). Furthermore, in accordance with an embodiment, the dimensions (e.g., length/depth, width/diameter, and/or height) of cavity/recess 216 may be customized for a given target application. As will be appreciated in light of this disclosure, it may be desirable to provide cavity/recess 216 with a geometry and/or dimensions which do not result in an overly complex external flow field which otherwise would disrupt/displace the lasing gas flow. As will be further appreciated, in some cases the depth-to-height ratio of cavity/recess 216 and/or the flow rate of the barrier gas bleed flow may be chosen, at least in part, based on the flow rate of the lasing gas, for example, to ensure that turbulence in the mixing region prevents or otherwise minimizes the ability of the alkali-saturated lasing gas and/or soot particles to reach side window 220. Other suitable geometries and/or dimensions for cavity/recess 216 will depend on a given application and will be apparent in light of this disclosure.

As previously noted, recessed side window assembly 200 may include one or more injectors 230 configured to deliver the barrier gas bleed flow to the interior of cavity/recess 216. As can be seen from FIG. 4B, the one or more injectors 230 may be operatively coupled with the one or more of the walls of cavity/recess 216. In some instances, an asymmetrical arrangement of injectors 230 may be provided, for example, to produce a desired vortex (discussed below) within cavity/recess 216. The quantity of injectors 230 utilized may depend, in some instances, on the desired flow strength and/or cavity dimensions.

In accordance with an embodiment, the one or more injectors 230 may deliver the barrier gas bleed flow into cavity/recess 216 so as to generate an internal counter-rotating flow. If an asymmetrical arrangement of injectors 216 is used, then the asymmetrical nature of the barrier gas jet flow may produce an internal vortex that allows the flow across the cavity/recess 216 to substantially match that of the lasing gas flow. Thus, the lasing gas (and/or co-flow, when present) may be prevented from entering the cavity/recess 216.

As will be appreciated in light of this disclosure, and in accordance with an embodiment, the flow rate of the injected barrier gas can be varied as desired for a given application. In some instances, it may be desirable to produce an internal rotating flow having a velocity which substantially matches that of the lasing gas stream (and/or co-flow, when present). As will be further appreciated, in some instances, it may be desirable to match the velocities to minimize or otherwise reduce flow separation due to velocity mismatch. However, as similarly noted above in the context of end window assembly 100, excessively increasing the buffer gas bleed flow velocity may disrupt/displace the lasing gas flow outside of the desired pumping region, thereby diminishing/fluctuating the power of the DPAL output beam or otherwise degrading system performance.

Also, much like in the context of the end window assembly 100 discussed above, recessed side window assembly 200 may include an aerodynamic adjustment 240. For example, as can be seen from FIG. 4B, in some instances cavity/recess 216 may be configured such that the downstream edge thereof is laterally offset from the upstream edge thereof and widened/stepped outward relative to pumping cavity 10. In accordance with an embodiment, such aerodynamic adjustment 240 may help, for example, to accommodate the increase in the flow of gas passing through pumping cavity 10 which may result by virtue of the barrier gas bleed flow being carried downstream. Aerodynamic adjustment 240 may permit the barrier gas to expand downstream of the pumping cavity 10, thus allowing the injected barrier gas bleed flow to transition to a wall jet which may be effectively injected parallel to the lasing gas flow, thereby minimally or otherwise negligibly disrupting/displacing the lasing gas flow.

In some embodiments, recessed side window assembly 200 may be operatively coupled (e.g., fluidly coupled) with a gas circulation system 700b, discussed below with reference to FIG. 8B, which is configured to provide the barrier gas bleed flow for injection into recessed side window assembly 200.

Co-Flow Techniques and Architecture

In a transversely pumped (e.g., side-pumped) DPAL, it may be desirable, in some instances, to ensure that the side windows are as close as possible to the lasing gas (or otherwise within a given tolerance). Therefore, in some cases, windows which are substantially flush with the pumping cavity may be utilized. However, such a configuration may result in the amplifier gas flow being substantially closer to the window surface as compared, for instance, to a recessed side window (discussed above). As will be appreciated in light of this disclosure, this proximity may increase the susceptibility of a given flush side window to chemical attack and/or soot deposition.

As previously noted, and in accordance with an embodiment, the disclosed techniques/architecture can be used to provide a co-flowing stream/jet of a non-alkali gas (or gas mixture) which substantially confines the lasing gas (e.g., by circumscribing or otherwise enveloping the lasing gas on all sides). As such, the co-flowing gas may serve as a gaseous barrier layer which may flow substantially flush with the walls of the pumping cavity (and thus a given flush side window), thereby preventing or otherwise reducing migration of the lasing gas to such window in a DPAL. As will be appreciated in light of this disclosure, the techniques disclosed herein for protecting a given side window (e.g., with one or multiple barrier gas layers) may be utilized, in some embodiments, regardless of: (1) how the DPAL is pumped (e.g., end pumped from one or more ends, side pumped from one or more sides, etc.); and/or (2) whether a bleed flow (e.g., such as that discussed above with reference to FIGS. 3 and 4B) is present. As will be further appreciated, some embodiments also may prevent or otherwise reduce migration of the lasing gas to the one or more end windows in a DPAL. Numerous configurations will be apparent in light of this disclosure.

In some cases, and in accordance with an embodiment, a DPAL system (or other laser system which utilizes a flowing gaseous amplifier medium) may be provided with structure/architecture configured to assist with providing such a gaseous barrier layer. For instance, consider FIG. 5A, which is a side perspective view of a flush side window assembly 300 configured in accordance with an embodiment of the present invention, and FIG. 5B, which is a side perspective view of an inner conduit 310 of the flush side window assembly 300 of FIG. 5A, in accordance with an embodiment of the present invention. As can be seen from these figures, flush side window assembly 300 may include an inner conduit 310 having a nozzle portion 312 and a diffuser portion 314 and having a gap 316 there between (e.g., such that the walls defining inner conduit 310 are interrupted or otherwise not continuous). As can be seen further, an outer conduit 360 may be provided around inner conduit 310 (e.g., coaxially or as otherwise desired for a given application) and may include one or more side windows 320 and/or end windows 322 disposed therein. As will be appreciated in light of this disclosure, flush side window assembly 300 may include additional, fewer, and/or different elements or components from those here described, and the claimed invention is not intended to be limited to any particular assembly configurations, but can be used with numerous configurations in numerous applications. For instance, in some cases, one or more of side windows 320 and/or end windows 322 may be configured as an aperture/open space rather than an optical window, and the one or more pump beams and/or DPAL output beam may be permitted to pass therethrough. In some cases, one or more of side windows 320 and/or end windows 322 may be configured as an optical mirror rather than an optical window, and the one or more pump beams and/or DPAL output beam may be reflected, partially or fully, therefrom.

As discussed below, inner conduit 310 may be configured to deliver a lasing gas flow to pumping cavity 10 while outer conduit 360 may be configured to deliver a co-flowing planar jet of a non-alkali barrier gas (e.g., a gas or gas mixture that is Rb-free, Cs-free, K-free, etc.) which circumscribes the lasing gas volume and which flows flush with the one or more flush side windows 320. Downstream of pumping cavity 10, inner conduit 310 and outer conduit 360 may be configured to recapture, in part or in whole, the lasing gas and the co-flowing gas, respectively.

In some cases, outer conduit 360 may serve as the pressure vessel for the gas flow of flush side window assembly 300. For instance, in some cases, outer conduit 360 may be configured such that flush side window assembly 300 is capable of handling pressures in the range of about 1-20 atm or greater (e.g., about 2-10 atm or greater). In some other cases, outer conduit 360 may serve as a vacuum vessel, for example, for eliminating air from the vessel and/or for guiding the gas flow (e.g., barrier gas co-flow and lasing gas flow) through flush side window assembly 300. As such, it may be desirable to provide an outer conduit 360, for example, having substantially rigid walls. To that end, and in accordance with an embodiment, outer conduit 360 may be constructed, in part or in whole, for example, with: (1) a metal (e.g., titanium, aluminum, etc.); (2) an alloy (e.g., stainless steel); (3) a ceramic; (4) an optical material, such as fused silica, sapphire, etc.; (5) a high-temperature polymer (e.g., polytetrafluoroethylene); (6) a combination of any of the aforementioned; and/or (7) any other suitable material, as will be apparent in light of this disclosure.

In accordance with an embodiment, outer conduit 360 (and thus flush side window assembly 300) may be generally configured with a contoured shape. For instance, as can be seen from FIG. 5A, the upstream portion 362 of outer conduit 360 may be provided with a generally converging shape, while the downstream portion 364 thereof may be provided with a generally diverging shape. In some cases, a throated portion 366 having a substantially straight shape may be located between upstream portion 362 and downstream portion 364. By virtue of such a configuration, outer conduit 360 (and thus flush side window assembly 300) may be configured, in general, to convert pressure to velocity (e.g., from the upstream portion 362 to the throated portion 366) and then back to pressure again (e.g., from the throated portion 366 through the downstream portion 364). The generally converging shape of upstream portion 362 of outer conduit 360 may help to accelerate the barrier gas co-flow, whereas the generally diverging shape of downstream portion 364 of outer conduit 360 may help to decelerate the barrier gas co-flow. As discussed below, inner conduit 310 may be provided with a similar converging-diverging configuration and thus may provide similar pressure/velocity capabilities, for example, in the context of the lasing gas flow. As will be appreciated in light of this disclosure, it may be desirable to configure outer conduit 360 so as to: (1) minimize or otherwise reduce power losses which may result during the pressure/velocity conversion processes; and/or (2) accelerate and/or decelerate the barrier gas co-flow with minimal or otherwise negligible loss of stagnation pressure.

In accordance with an embodiment, outer conduit 360 may be configured to provide, in part or in whole, the flow path for the barrier gas co-flow. For instance, the interstitial space between the walls of outer conduit 360 and the walls of inner conduit 310 (discussed below) generally may define the flow path for the barrier gas co-flow, in accordance with an embodiment.

As can be seen from FIG. 5A, in some embodiments, outer conduit 360 may have disposed therein one or more optical windows (and/or mirrors, apertures, etc.) which may be used, for example, in a DPAL system. For instance, in some cases, outer conduit 360 may have one or more flush side windows 320 disposed therein. In some such embodiments, the flush side window(s) 320 may be disposed at throated portion 366 and substantially aligned with gap 316 (e.g., such that the one or more pump beams may enter from any or all of such side windows 320 and be incident in substantially orthogonal fashion with the lasing gas), such as is shown in FIG. 6A, discussed below. In some cases, outer conduit 360 may have one or more end windows 322 disposed therein. In some embodiments, the end window(s) 322 may be disposed at throated portion 366 and aligned with gap 316 along the lasing axis (e.g., such that the DPAL output beam may be directed out of a given end window 322 and the one or more pump beams may enter from one or more of such end windows 322 and be incident in substantially orthogonal fashion with the lasing gas). In some embodiments, a given end window 322 may be oriented such that its major surfaces (e.g., the surfaces through which the DPAL output beam is to pass) are substantially perpendicular (e.g., exactly or otherwise within a desired variance) to the lasing axis of the DPAL. However, the claimed invention is not so limited, as in some other cases, a given end window 322 may be oriented/offset at an angle relative to the lasing axis (e.g., at or near the Brewster's angle; etc.). Furthermore, as previously noted, some embodiments may include windows 320 and/or 322 which are apertures/open spaces or optical mirrors, as desired for a given target application or end use. Other suitable optical window 320/

322 configurations for outer conduit 360 will depend on a given application and will be apparent in light of this disclosure.

It should be noted, however, that the claimed invention is not so limited. For instance, in some other embodiments, outer conduit 360 may be configured such that a greater portion thereof (e.g., a larger area of throated portion 366) is constructed from or otherwise includes a desired optical material, optical mirror, aperture, etc., and thus provides a side window 320, an end window 322, etc., of larger dimensions. In some still other embodiments, outer conduit 360 itself may be constructed from a desired optical material and thus serve as a given optical window (e.g., a side window 320, an end window 322, etc.). Numerous configurations will be apparent in light of this disclosure.

In accordance with an embodiment, inner conduit 310 may be designed to physically separate the lasing gas flow, for example, from the barrier gas co-flow. As such, it may be desirable to provide an inner conduit 310, for example, having semi-rigid walls. To that end, and in accordance with an embodiment, inner conduit 310 may be constructed, in part or in whole, for example, with: (1) a metal (e.g., titanium, aluminum, etc.); (2) an alloy (e.g., stainless steel); (3) a ceramic; (4) an optical material, such as fused silica, sapphire, etc.; (5) a high-temperature polymer (e.g., polytetrafluoroethylene); (6) a combination of any of the aforementioned; and/or (7) any other suitable material, as will be apparent in light of this disclosure.

In some embodiments, inner conduit 310 may be generally configured with a contoured shape, much like outer conduit 360 discussed above. For instance, as can be seen from FIG. 5B, the nozzle portion 312 of inner conduit 310 may be provided with a generally converging shape, while the diffuser portion 314 thereof may be provided with a generally diverging shape. In accordance with an embodiment, a gap 316 may be provided or otherwise defined between the exit 312a of nozzle portion 312 and the inlet 314a of diffuser portion 314 such that the walls of inner conduit 310 are interrupted or otherwise not continuous. The interior of inner conduit 310 may be configured to define, in part or in whole, the flow path for the lasing gas flow. Also, as previously noted, the exterior of the walls of inner conduit 310 may help to define, in conjunction with the interior of the walls of outer conduit 360, the flow path for the barrier gas co-flow.

By virtue of such a configuration, inner conduit 310 may be configured, in general, to convert pressure to velocity (e.g., from the nozzle portion 312 to the gap 316) and then back to pressure again (e.g., from the gap 316 through the diffuser portion 314). The generally converging shape of nozzle portion 312 may help to accelerate the lasing gas flow, whereas the generally diverging shape of diffuser portion 314 may help to decelerate the lasing gas flow. In some instances, such a configuration may assist with heat removal from pumping cavity 10. As will be appreciated in light of this disclosure, it may be desirable to configure inner conduit 310 so as to: (1) minimize or otherwise reduce power losses which may result during the pressure/velocity conversion processes; and/or (2) accelerate and/or decelerate the lasing gas flow with minimal or otherwise negligible loss of stagnation pressure.

In accordance with an embodiment, inner conduit 310 may be positioned within outer conduit 360 such that gap 316 is substantially aligned with one or more of the windows (e.g., flush side windows 320 and/or end windows 322) which may be included at throated portion 366 of outer conduit 360. By virtue of such an arrangement, the one or more pump lasers may be permitted to pass through the outer housing 360 at flush side windows 320 and/or end windows 322 and through to the lasing gas flow in gap 316 with minimal or otherwise negligible interference from inner conduit 310 (e.g., by nozzle portion 312 and/or diffuser portion 314). In some cases, gap 316 may have a length or other dimension in the range of about 1-10 mm or greater (e.g., about 2-5 mm; about 5-8 mm; etc.). However, the claimed invention is not so limited, as in some other example embodiments, gap 316 may have a length or other dimension in the range of about 1-10 cm or greater (e.g., about 2-5 cm; about 5-8 cm; etc.) Other suitable dimensions for gap 316 will depend on a given application and will be apparent in light of this disclosure.

Figure 5B:
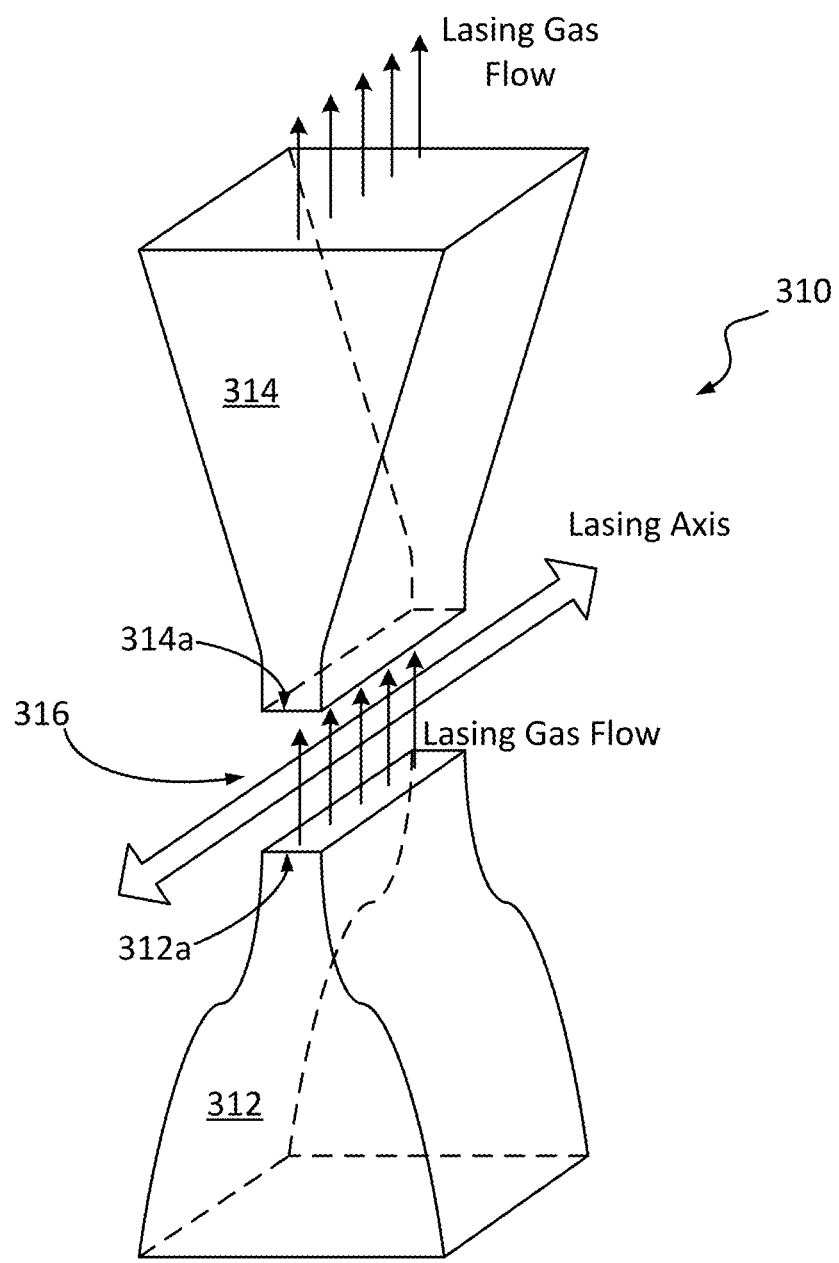
FIG. 5B is a side perspective view of an inner conduit of the flush side window assembly of FIG. 5A, in accordance with an embodiment of the present invention.

In accordance with an embodiment, nozzle portion 312 of inner conduit 310 may be configured to deliver the lasing gas to gap 316. The generally converging/tapering shape (e.g., in one or multiple dimensions) of nozzle portion 312 may help to accelerate the lasing gas flow as it leaves exit 312a to enter gap 316. In some cases, it may be desirable to accelerate the lasing gas flow with minimal or otherwise negligible loss of stagnation pressure. In some embodiments, the portion of the walls of inner conduit 310 which define the exit 312a of nozzle portion 312 may decrease or otherwise taper in thickness (i.e., may be configured with knife-edges 313) as they progress towards gap 316, as can be seen with reference to FIG. 6A, discussed below. It should be noted that while FIGS. 5A and 5B depict example embodiments in which nozzle portion 312 and diffuser portion 314 taper in only one dimension, the claimed invention is not so limited. For instance, in some other example embodiments, one or more of nozzle portion 312 and/or diffuser portion 314 (e.g., and thus exit 312a and/or inlet 314a, respectively) may taper in two or more dimensions, as desired for a given target application. In accordance with an embodiment, knife-edged walls 313 may help to retain laminar flow by keeping the barrier gas co-flow and the lasing gas flow separated as they traverse gap 316.

As will be appreciated in light of this disclosure, it may be desirable to configure nozzle portion 312, for example: (1) to minimize or otherwise reduce the pump power; and/or (2) to maximize or otherwise increase the mass throughput for a given pump power. In some instances, it may be desirable to maximize or otherwise increase the discharge coefficient of nozzle portion 312. In some embodiments, nozzle portion 312 may be configured to provide a mass flow rate in the range of about 1-100 g/s (e.g., about 1-10 g/s; about 10-80 g/s; etc.) or greater. Other suitable mass flow rates and/or configurations for nozzle portion 312 will depend on a given application and will be apparent in light of this disclosure.

In accordance with an embodiment, nozzle portion 312 may be configured with any geometry desired for a given target application. In some instances, adjustment may be made to the geometry of nozzle portion 312, for example, to produce different power output levels and/or optical-to-optical efficiencies for a given DPAL system. In some embodiments, nozzle portion 312 may be configured with a geometry that is substantially symmetrical. For instance, in one specific example embodiment, nozzle portion 312 may be provided with a substantially rectangular cross-sectional geometry (e.g., such as can be seen from FIG. 5B). However, the claimed invention is not so limited, as in some other embodiments, the geometry of nozzle portion 312 may be asymmetrical. In some instances, it may be desirable to configure nozzle portion 312 such that: (1) the lasing gas flow leaving exit 312a experiences minimal or otherwise negligible frictional pressure losses; and/or (2) the lasing gas flow is a substantially parallel, planar jet upon leaving exit 312a and entering pumping cavity 10. To that end, and in accordance with an embodiment, computational fluid dynamics software/programming (e.g., ANSYS® Fluent® software) may be used, for example, to determine what geometry of nozzle portion 312 may produce the desired results.

In accordance with an embodiment, nozzle portion 312 may be dimensioned as desired for a given target application. For instance, some example suitable aspect ratios (e.g., length-to-width ratios) for nozzle portion 312 may include, but are not limited to: about 80-to-1 or less; about 50-to-1 or less; about 20-to-1 or less; about 15-to-1 or less; about 10-to-1 or less; about 5-to-1 or less; about 2-to-1 or less; etc. Thus, in the example context in which nozzle portion 312 has an aspect ratio of about 10-to-1, nozzle portion 312 may be dimensioned, for instance, with: a length of about 13 mm and a width of about 1.3 mm; a length of about 3 cm and a width of about 3 mm; a length of about 10 cm and a width of about 1 cm; etc. However, the claimed invention is not so limited, as in some other example instances, greater and/or lesser aspect ratios may be utilized, in accordance with an embodiment. In one example case, nozzle portion 312 may be configured such that its exit 312a converges to a geometry that is about 1 mm wide and about 1 cm deep. In some other example cases, nozzle portion 312 may be configured such that its exit 312a has at least one dimension in the range of about 1-10 mm (e.g., for use with a stable resonator configuration). In some still other example cases, nozzle portion 312 may be configured such that its exit 312a has at least one dimension in the range of about 1-10 cm (e.g., for use with an unstable resonator configuration). Furthermore, in some cases, the cross-sectional area of nozzle portion 312 may decrease (e.g., as it converges) by a factor of greater than two, greater than five, greater than ten, or greater than twenty going in the direction of the lasing gas flow (e.g., towards the exit 312a of nozzle portion 312). Other suitable dimensions and/or aspect ratios for nozzle portion 312 will depend on a given application and will be apparent in light of this disclosure.

In accordance with an embodiment, diffuser portion 314 of inner conduit 310 may be configured to recapture/collect the lasing gas flow after it has traversed gap 316 and/or to recover the dynamic pressure of the lasing gas flow. The generally diverging shape of diffuser portion 314 may help to expand the lasing gas, converting velocity to pressure and thus decelerating the lasing gas flow. In some cases, it may be desirable to decelerate the lasing gas flow with minimal or otherwise negligible loss of stagnation pressure while reducing turbulence. Thus, in some embodiments, the portion of the walls of inner conduit 310 which define the inlet 314a of diffuser portion 314 may be configured with blunted-edges 315 (e.g., as can be seen with reference to FIG. 6A, discussed below) which may help to separate the lasing gas flow from the barrier gas co-flow as the lasing gas enters the inlet of diffuser portion 314. Downstream of diffuser portion 314, inner conduit 310 may be configured as a gradually diverging channel, which may help to convert the kinetic energy of the lasing gas into increased static pressure with minimal or otherwise acceptable frictional losses.

In accordance with an embodiment, diffuser portion 314 may be configured with any geometry desired for a given target application. In some instances, adjustment may be made to the geometry of diffuser portion 314, for example, to produce different power output levels and/or optical-to-optical efficiencies for a given DPAL system. In much the same fashion as discussed above in the context of nozzle portion 312, diffuser portion 314 may be configured with a geometry that is substantially symmetrical or asymmetrical, as desired. In some embodiments, diffuser portion 314 may be provided with a cross-sectional geometry which substantially matches that of nozzle portion 312 (e.g., a substantially rectangular cross-section, such as can be seen from FIG. 5B). In some instances, it may be desirable to configure diffuser portion 314 such that the lasing gas flow entering at inlet 314a experiences minimal (or otherwise negligible) frictional pressure losses. To that end, and in accordance with an embodiment, computational fluid dynamics software/programming (e.g., ANSYS® Fluent® software) may be used, for example, to determine what geometry of diffuser portion 314 may produce the desired results.

In accordance with an embodiment, diffuser portion 314 may be dimensioned as desired for a given target application. As will be appreciated in light of this disclosure, it may be desirable in some instances to configure diffuser portion 314 with an aspect ratio and/or dimensions which substantially match those of nozzle portion 312. For instance, in one example embodiment, inlet 314a of diffuser portion 314 may be provided with a geometry that is about 1 mm wide and about 1 cm deep to match exit 312a of nozzle portion 312. However, the claimed invention is not so limited, as in some other instances, diffuser portion 314 (e.g., inlet 314a) may be provided with an aspect ratio and/or dimensions which are greater than those of nozzle portion 312 (e.g., exit 312a). Other suitable dimensions for diffuser portion 314 will depend on a given application and will be apparent in light of this disclosure.

FIG. 6A is a partial cross-sectional view of a flush side window assembly 300, configured in accordance with an embodiment of the present invention. As can be seen, flush side window assembly 300 may be configured to deliver two gas streams (e.g., a lasing gas flow via inner conduit 310 and a surrounding barrier gas co-flow via outer conduit 360) to the pumping cavity 10 and to recover those streams downstream of the pumping cavity 10. In the depicted example embodiment, the lasing gas may enter gap 316 at the exit 312a of nozzle portion 312. While in gap 316, the lasing gas may pass through pumping region 396, where it may be optically pumped, for example, by one or more pump beams provided through: (1) one or more flush side windows 320; (2) one or more end windows 322; and/or (3) a combination of any of the aforementioned or other optical input/output window configuration (e.g., apertures, optical mirrors, etc.). Downstream of pumping region 396, the lasing gas may be recaptured at the inlet 314a of diffuser portion 314.

The co-flowing gas may be made to enter the pumping cavity 10 from the upstream portion 362 of outer conduit 360 outside of nozzle portion 312. By virtue of this configuration, the co-flowing gas may be made to circumscribe/surround the lasing gas volume as it traverses gap 316, thus providing a centrally located planar/laminar jet of lasing gas surrounded by a co-flowing planar/laminar jet of a non-alkali barrier gas. As will be appreciated in light of this disclosure, the three-dimensional nature of the internal lasing gas flow and the surrounding barrier gas co-flow generally can be likened, in some example cases, to a rectangular box within a rectangular tube. Thereafter, the co-flowing gas may be recovered by the downstream portion 364 of outer conduit 360 outside of diffuser portion 314.

As can be seen best from FIGS. 5B and 6A, flush side window assembly 300 may be configured (e.g., by virtue of how outer conduit 360 and/or inner conduit 310 are configured) to provide a pumping region 396 having a substantially rectangular box-like/cuboid geometry. In one specific example embodiment, pumping region 396 may have a volume in the range of about 0.01-10 cm$^3$ or greater (e.g., about 1 cm$^3$ or less; about 3 cm$^3$ or less; etc.). Other suitable geometries and/or dimensions for pumping region 396 will depend on a given application and will be apparent in light of this disclosure.

In some cases, pumping region 396 may be made to reside substantially (e.g., entirely or otherwise within a given tolerance) within the TEM$_{00}$ mode envelope 397 of the pumping cavity 10 (e.g., of a stable optical resonator; of an unstable optical resonator; etc.). As will be appreciated in light of this disclosure, it may be desirable to ensure that the pump region 396 is overlapped as much as possible (or to an otherwise desired degree) by the TEM$_{00}$ mode envelope 397 (discussed below) of the stable/unstable optical resonator and that the lasing gas stream is permitted to flow such that the one or more pump beams intersect the lasing gas stream substantially (e.g., only or otherwise within a given tolerance) inside the TEM$_{00}$ mode envelope 397. In some cases, such a configuration may result in high geometrical DPAL efficiency and thus help to maximize output beam power.

As previously noted, the lasing gas can be configured to have an approximately rectangular stream geometry (e.g., by virtue of how nozzle portion 312 may be configured). In accordance with an embodiment, this stream geometry can be substantially contained (e.g., fully or otherwise within a desired tolerance) within the DPAL's TEM$_{00}$ Gaussian output beam (e.g., implementing either a stable or unstable optical cavity). Thus, such a stream geometry may help to ensure that any pump-bleached alkali vapor atoms and/or ions lie within a confined volume which can have high geometrical overlap (e.g., full or an otherwise desired amount) with the TEM$_{00}$ mode envelope 397 of the DPAL's Gaussian output beam. As will be appreciated in light of this disclosure, the higher the geometric overlap between the DPAL TEM$_{00}$ Gaussian output beam and the rectangular pump-bleached alkali vapor region, the greater the suppression of ASE losses. In accordance with an embodiment, this may help to increase optical-to-optical efficiency and/or reduce the waste heat per watt of the DPAL output beam. In accordance with an embodiment, the presence of the co-flowing gas around the lasing gas flow may help to eliminate regions (e.g., at the flush side window 320) of alkali atoms and/or ions which otherwise might be pumped but not stimulated and thus lead to ASE losses which would lower optical-to-optical efficiency (as previously discussed).

As will be appreciated in light of this disclosure, and in accordance with an embodiment, adjustment to the dimensions of inner conduit 310 (e.g., nozzle portion 312, diffuser portion 314, gap 316, etc.) and/or outer conduit 360 may be made to alter the dimensions of the lasing gas flow relative to the dimensions of the barrier gas co-flow and/or vice versa. In some cases, the net cross-sectional area of the lasing gas flow and the barrier gas co-flow may be approximately equal. In some instances, the lasing gas flow may be dimensioned (e.g., by virtue of a given configuration of inner conduit 312) such that it is less than or equal to the dimensions of the TEM$_{00}$ mode envelope 397. In some cases, the TEM$_{00}$ mode envelope 397 may have a width/diameter in the range of about 1-3 mm or greater. In some other cases, such as in the context of an unstable resonator, the TEM$_{00}$ mode envelop 397 may have a width/diameter in the range of about 3-30 mm or greater. As will be further appreciated in light of this disclosure, and in accordance with an embodiment, adjustment to the dimensions of inner conduit 310 (e.g., nozzle portion 312, diffuser portion 314, gap 316, etc.) and/or outer conduit 360 may be made, in part, to alter the gas flow of flush side window assembly 300. Furthermore, and in accordance with an embodiment, the dimensions of inner conduit 310 (e.g., nozzle portion 312, diffuser portion 314, etc.) may be adjusted as desired to ensure that gap 316 is sufficiently large to prevent or otherwise reduce incidence of inner conduit 310 with the one or more pump beams and/or DPAL output beam (e.g., by providing a suitable distance between TEM$_{00}$ envelope 397 and knife-edged walls 313 and/or blunt-edged walls 315).

Figure 6B:
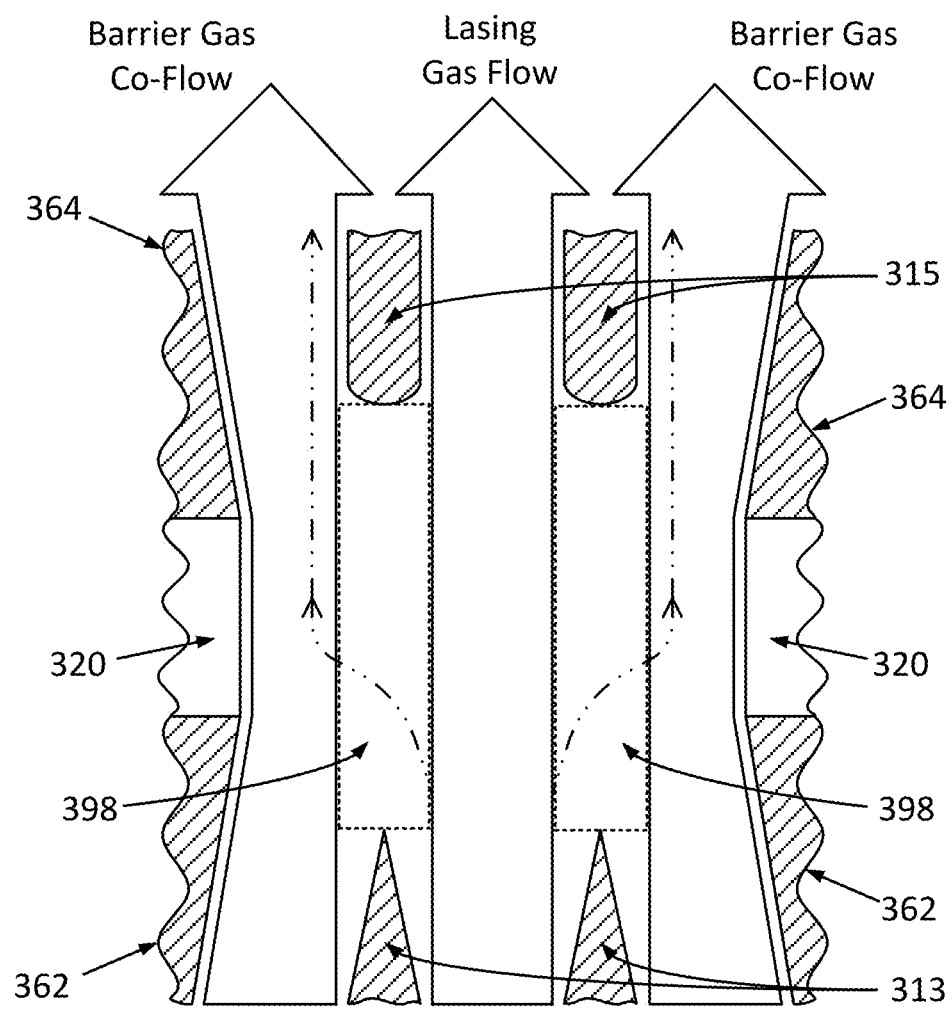
FIG. 6B is a partial cross-sectional view of a flush side window assembly configured in accordance with an embodiment of the present invention.

FIG. 6B is a partial cross-sectional view of a flush side window assembly 300, configured in accordance with an embodiment of the present invention. As can be seen, the co-flowing gas may be made to pass beside the lasing gas flow, separated by a substantially rectangular perimeter of: (1) knife-edged walls 313 on the delivery side of the gap 316 (e.g., provided by the exit of nozzle portion 312); and/or (2) blunt-edged walls 315 on the receiver side of the gap 316 (e.g., provided by the inlet of diffuser portion 314). In some cases, it may be desirable to configure nozzle portion 312 and/or diffuser portion 314 so as to provide a boundary between the co-flowing gas and the lasing gas flow which results in minimal or otherwise negligible flow separation across the gap 316 and/or reduces generation of small scale flow vortices.

As can be seen further, in some cases, diffusive mixing regions 398 may result alongside the lasing gas flow. In such diffusive mixing regions 398, the lasing gas may intrude into the co-flowing gas during its transit across gap 316. However, as generally depicted by the dashed-and-dotted lines in FIG. 6B, the lasing gas which enters the co-flowing gas may be carried away downstream without being incident to the flush side windows 320. Thus, and in accordance with an embodiment, the co-flowing gas may: (1) function as a barrier layer between the amplifier gas and the flush side windows 320, preventing attack thereof by pump-bleached alkali atoms and/or ions; (2) carry away reaction products (if any) to minimize or otherwise reduce fouling of the flush side windows 320; and/or (3) carry away excess locally generated heat resulting from pumping of the lasing gas by the one or more pump beams. Other suitable uses of the co-flowing gas will depend on a given application and will be apparent in light of this disclosure.

In some embodiments, the lasing gas and the co-flowing gas may enter pumping cavity 10 with different temperatures. For instance, in one example, the lasing gas passing through nozzle portion 312 may have a temperature in the range of about 100° C. or greater (e.g., about 150-200° C.), while the co-flowing gas passing around nozzle portion 312 may have a temperature in the range of about 100° C. or less (e.g., about room temperature). Other suitable temperature ranges and/or differences for the lasing gas and/or the co-flowing gas will depend on a given application and will be apparent in light of this disclosure.

In accordance with an embodiment, the lasing gas and the co-flowing gas may be permitted to physically interact, for example, only during the transit across gap 316 (e.g., at the one or more diffusive mixing regions 398), which may be relatively brief in duration (e.g., in the range of about 5-10 µs or less). The brevity of this transit may help to minimize or otherwise reduce loss of the alkali vapor of the lasing gas into the co-flowing gas. To ensure that the cross-mixing of the barrier gas and the lasing gas is minimized (or otherwise negligible) during the transit across gap 316, it may be desirable to ensure that: (1) the nozzle portion 312 is configured to match (e.g., approximately equal or otherwise within a given tolerance) the velocity of the co-flowing gas and the lasing gas flow; and/or (2) the diffuser portion 314 is configured for equal pressure recovery. Matching the pressure and/or velocity of the co-flowing gas with that of the lasing gas flow (e.g., to within a factor of less than 1.1, less than 1.3, less than 1.5, etc., difference) may help, for instance: (1) to minimize eddy-current mixing of the two gas streams; (2) to reduce the presence of vortical structures; and/or (3) to reduce shear-flow turbulences. As will be appreciated in light of this disclosure, this may help to minimize or otherwise reduce flow-induced unsteadiness in pumping region 10, and thus may help to increase optical-to-optical efficiency, in accordance with an embodiment. In some example cases, the lasing gas and co-flowing gas may be provided with a flow velocity in the range of about 50-1000 m/s or less (e.g., about 700 m/s or less; about 780 m/s or less; about 860 m/s or less; etc.). However, the claimed invention is not so limited, as in some other instances, the flow velocity may be greater than about 1000 m/s. Other suitable flow velocities for the lasing gas and/or co-flowing gas will depend on a given application and will be apparent in light of this disclosure.

As will be appreciated in light of this disclosure, and in accordance with an embodiment, it may be desirable to provide a lasing gas flow and barrier gas co-flow having a ratio of velocities which minimizes or otherwise reduces shear between the streams and thus minimizes or otherwise reduces the generation of small vortices which would cause undesirable mixing of the gases. However, as will be appreciated further, the lasing gas and/or the co-flowing gas may be subjected to heating from any of a number of sources/mechanisms while traversing gap 316, which may increase their velocities (and thus alter the ratio/matching of their velocities) through gap 316. For instance, in some cases a portion of the one or more pump beams and/or the beam within the resonator cavity (e.g., the would-be DPAL output beam) may be absorbed by outer conduit 360 and/or inner conduit 310 (e.g., particularly in the region of knife-edged walls 313 of nozzle portion 312 and blunt-edged walls 315 of diffuser portion 314), producing localized heating of those surfaces which, in turn, may transfer heat to the lasing gas and/or co-flowing gas. Furthermore, in some cases, power losses due to fluorescence and/or ASE may result in illumination of outer conduit 360 and/or inner conduit 310, particularly in the region of knife-edged walls 313 and blunt-edged walls 315, producing localized heating which may transfer heat to the lasing gas and/or co-flowing gas. Still further, collisional quenching of the pump level to the lasing level (e.g., of three-level alkali atoms, such as Rb) may result in a few percent power loss (e.g., about 2% for Rb), in some instances, which may be deposited exclusively or otherwise primarily into the lasing gas, thereby heating the lasing gas. Heating from these and/or other sources/mechanisms may result, for instance, in thermal expansion and consequent acceleration of the gases. Therefore, velocity matching of the lasing gas flow and barrier gas co-flow may depend, in part, on accounting for the spatial distribution of heat deposition into the two gas streams.

As can be seen, for example, from the embodiments illustrated in FIGS. 5A-5B and 6A-6B, inner conduit 310 can be configured such that the cross-sectional area of the lasing gas flow entering gap 316 from nozzle portion 312 is about equal to the cross-sectional area of the lasing gas flow leaving gap 316 to enter diffuser portion 314. As can further be seen, outer conduit 360 and inner conduit 310 can be configured such that the void/region defined there between (e.g., which guides the barrier gas co-flow) has an approximately equal cross-section on both sides of gap 316 (e.g., leaving upstream portion 362 and entering downstream portion 364). As will be appreciated in light of this disclosure, and in accordance with an embodiment, such a configuration may be desirable, for example, in some cases in which heating of the co-flowing gas around the region of gap 316 is comparable with heating of the lasing gas passing through gap 316.

However, there may be instances in which the heating of the co-flowing gas is not comparable to that of the lasing gas. For instance, if power loss mechanisms which deposit power into the co-flowing gas dominate, then the co-flowing gas may absorb more heat and thus expand more than the lasing gas. Conversely, if power loss mechanisms that deposit power into the lasing gas dominate, then the lasing gas may absorb more heat and thus expand more than the co-flowing gas. Therefore, and in accordance with an embodiment, the spacing between blunt-edged walls 315 of diffuser portion 314 relative to the spacing between knife-edged walls 313 of nozzle portion 312 may be adjusted, for example, to improve matching of the velocities of the lasing gas and the co-flowing gas through/around gap 316.

Figure 7A:
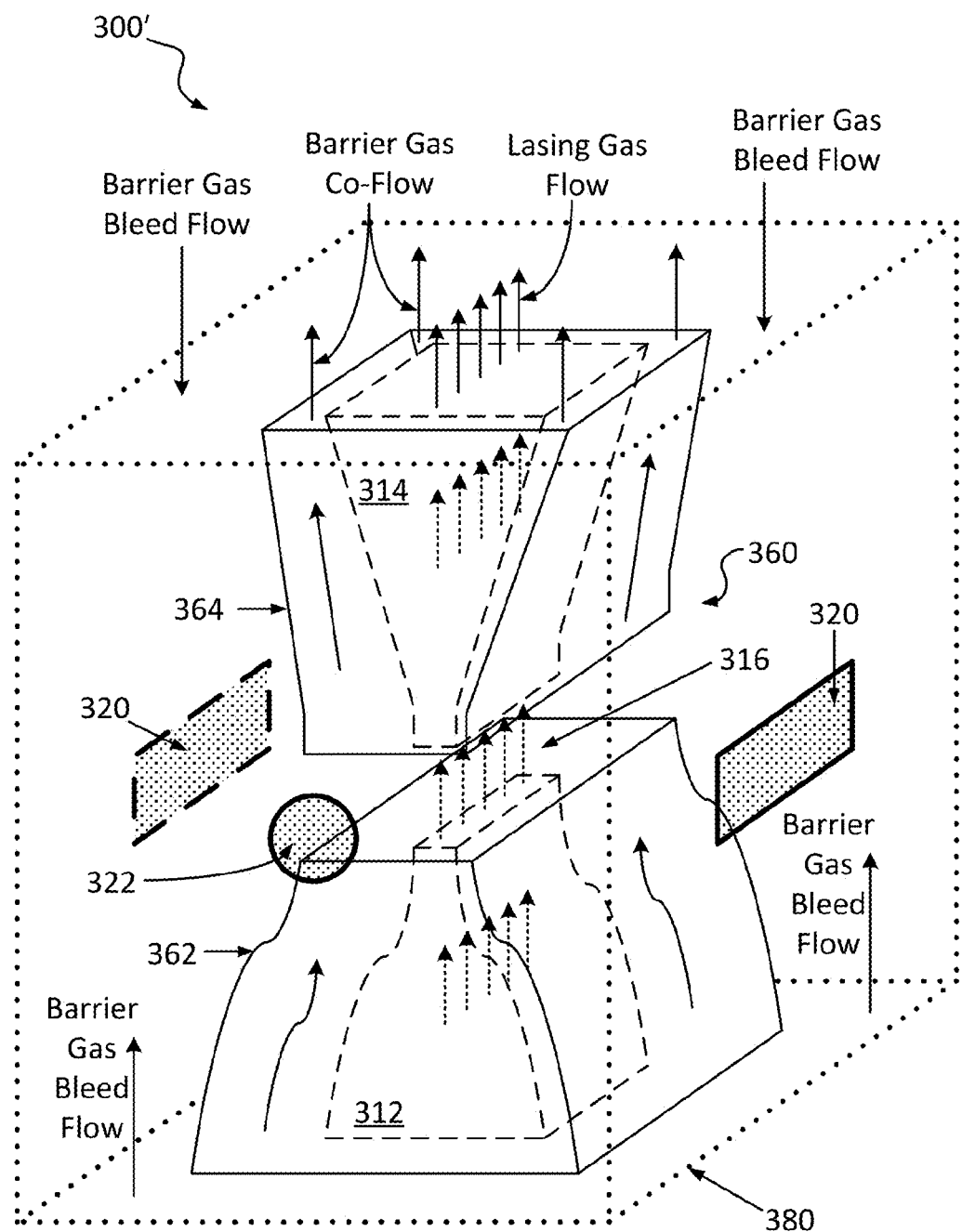
FIG. 7A is a side perspective view of a multiple barrier side window assembly configured in accordance with an embodiment of the present invention.

FIG. 7A is a side perspective view of a multiple barrier side window assembly 300' configured in accordance with an embodiment of the present invention. As can be seen, assembly 300' may be configured in much the same way as assembly 300 (discussed above), with an example difference being that the walls defining outer conduit 360 may be interrupted or otherwise not continuous (e.g., much like previously noted with respect to inner conduit 310) and the one or more side windows 320 and/or end windows 322 may be omitted from such outer conduit 360. Even with such an interruption, outer conduit 360 may be configured to provide the desired barrier gas co-flow, as previously discussed, which may help to confine the lasing gas volume. As can further be seen, an external housing 380 may be included and configured so as to surround or otherwise enclose outer conduit 360 (e.g., upstream portion 362 and downstream portion 364) and inner conduit 310 (e.g., nozzle portion 312 and diffuser portion 314). As will be appreciated in light of this disclosure, and in accordance with an embodiment, housing 380 may be constructed using any of the example materials previously discussed with reference to outer conduit 360 and inner conduit 310. In some cases, housing 380 may have disposed therein or otherwise be configured to provide one or more optical windows (e.g., side windows 320, end windows 322, etc.), which may be aligned with gap 316, as previously described.

In accordance with an embodiment, housing 380 may be configured to provide a bleed flow of a non-alkali barrier gas (e.g., much like that described above in the context of FIGS. 3 and 4B) which may assist in isolating the one or more side windows 320 and/or end windows 322 of housing 380 from the lasing gas flowing through inner conduit 310. The interstitial space between the walls of outer conduit 360 and the walls of housing 380 generally may define the flow path for the barrier gas bleed flow. Thus, and in accordance with an embodiment, assembly 300' may be configured to provide a given DPAL system with multiple containment/barrier layers of alkali-free gas(es), which can be used to aid in preserving any of the optical surfaces (e.g., windows, coatings, etc.) implemented therewith from chemical attack by the alkali vapor of the lasing gas and/or soot buildup. Other suitable configurations for housing 380 and/or assembly 300' will depend on a given application and will be apparent in light of this disclosure.

Figure 7B:
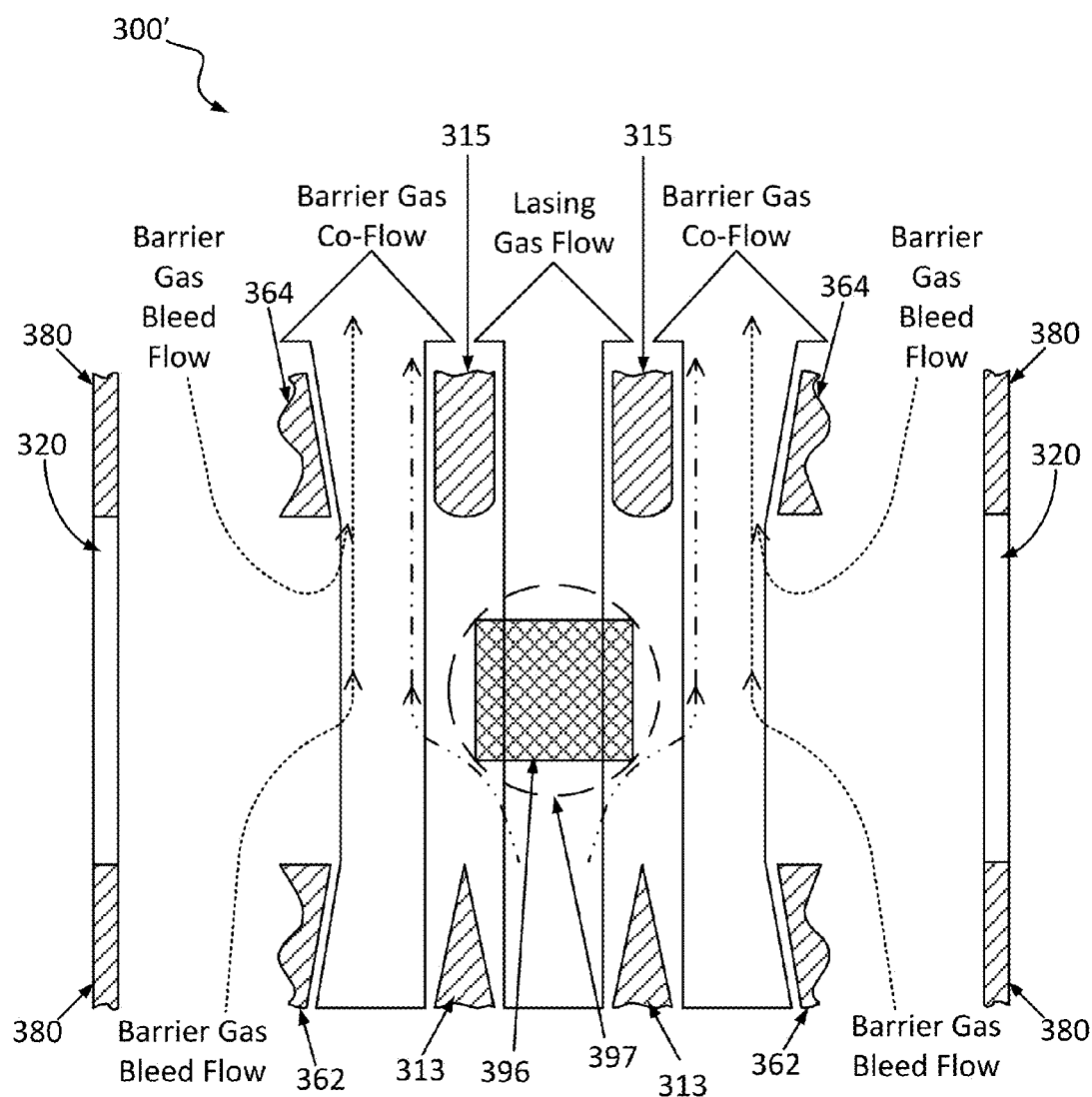
FIG. 7B is a partial cross-sectional view of a multiple barrier side window assembly configured in accordance with an embodiment of the present invention.

FIG. 7B is a partial cross-sectional view of a multiple barrier side window assembly 300', configured in accordance with an embodiment of the present invention. As can be seen, the barrier gas bleed flow through housing 380 may be made to pass outside of the barrier gas co-flow, separated by the outer walls of upstream portion 362 and downstream portion 364. In accordance with an embodiment, it may be desirable in some instances to allow a small amount of the non-alkali gas of the bleed flow (e.g., in the range of less than or equal to about 0.1% to 1%) to mix into the barrier gas co-flow and to be swept downstream through inlet 314a of diffuser portion 314, while the remainder of the bleed flow migrates downstream between outer conduit 360' and housing 380. In accordance with an embodiment, the barrier gas bleed flow of assembly 300' may: (1) function as a barrier layer between the barrier gas co-flow and the flush side windows 320 of housing 380; (2) carry away reaction products (if any) to minimize or otherwise reduce fouling of the flush side windows 320; and/or (3) carry away excess locally generated heat. Other suitable uses of the barrier gas bleed flow in conjunction with the barrier gas co-flow will depend on a given application and will be apparent in light of this disclosure.

In some embodiments, a given flush side window assembly 300/300' may be operatively coupled (e.g., fluidly coupled) with a gas circulation system 800, discussed below with reference to FIG. 9, which is configured: (1) to circulate the lasing gas through inner conduit 310; (2) to circulate the barrier gas through outer conduit 360; and/or (3) to circulate the bleed flow gas through housing 380.

Supporting Gas Circulation Systems

Figure 8A:
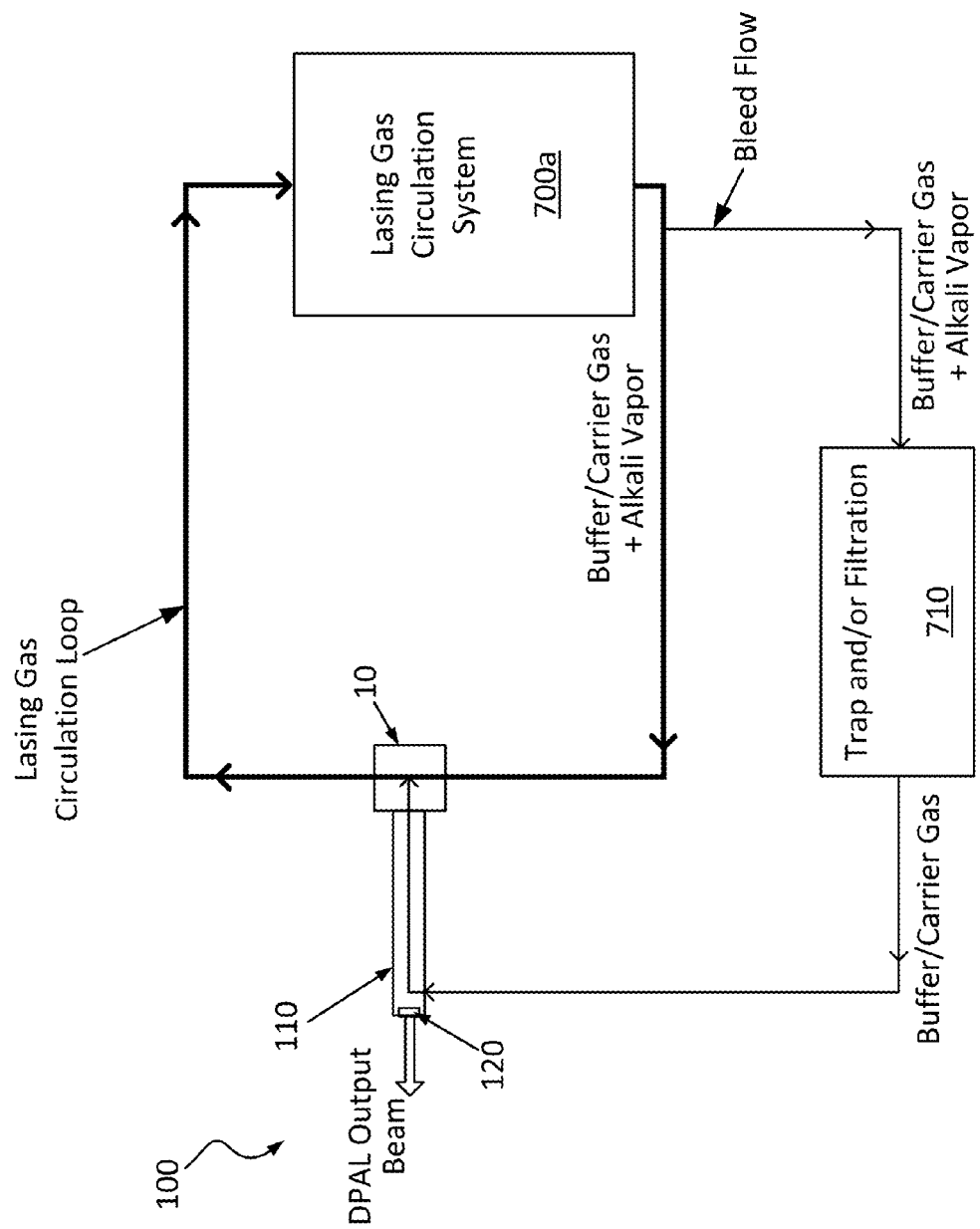
FIG. 8A is a schematic view of an example implementation of a lasing gas circulation system configured in accordance with an embodiment of the present invention.

FIG. 8A is a schematic view of an example implementation of a lasing gas circulation system 700a configured in accordance with an embodiment of the present invention. As can be seen, lasing gas circulation system 700a may be utilized, for example, in the context of a diffusive/convective end window assembly 100. Lasing gas circulation system 700a may be configured to drive a lasing gas circulation loop (represented by the bolded line in the figure), which provides the lasing gas (e.g., buffer/carrier gas including alkali vapor) to pumping cavity 10. As will be appreciated in light of this disclosure, lasing gas circulation system 700a may include additional, fewer, and/or different elements or components from those here described, and the claimed invention is not intended to be limited to any particular system configurations, but can be used with numerous configurations in numerous applications.

In accordance with an embodiment, the gas to be used as the gaseous barrier layer in an end window assembly 100 may be derived from a small bleed flow from the lasing gas circulation loop which is subsequently directed to a trap and/or filtration component 710. Trap and/or filtration component 710 may be configured, in some embodiments, to remove the alkali vapor from the lasing gas. Also, trap and/or filtration component 710 may be configured to provide the separated buffer/carrier gas for downstream use (e.g., to be used as a gaseous barrier layer in end window assembly 100). Trap and/or filtration component 710 may include one or more filters, for example, for filtering out any unwanted substances (e.g., particles, ions, vapors, etc.) which may be produced during the lasing process, thereby maintaining the cleanliness of the barrier gas. The buffer/carrier gas may be delivered to the one or more injectors 130 of end window assembly 100 and can form a gaseous barrier layer, as previously discussed (e.g., in the context of FIG. 3). Other suitable implementations of lasing gas circulation system 700a will depend on a given application and will be apparent in light of this disclosure.

Figure 8B:
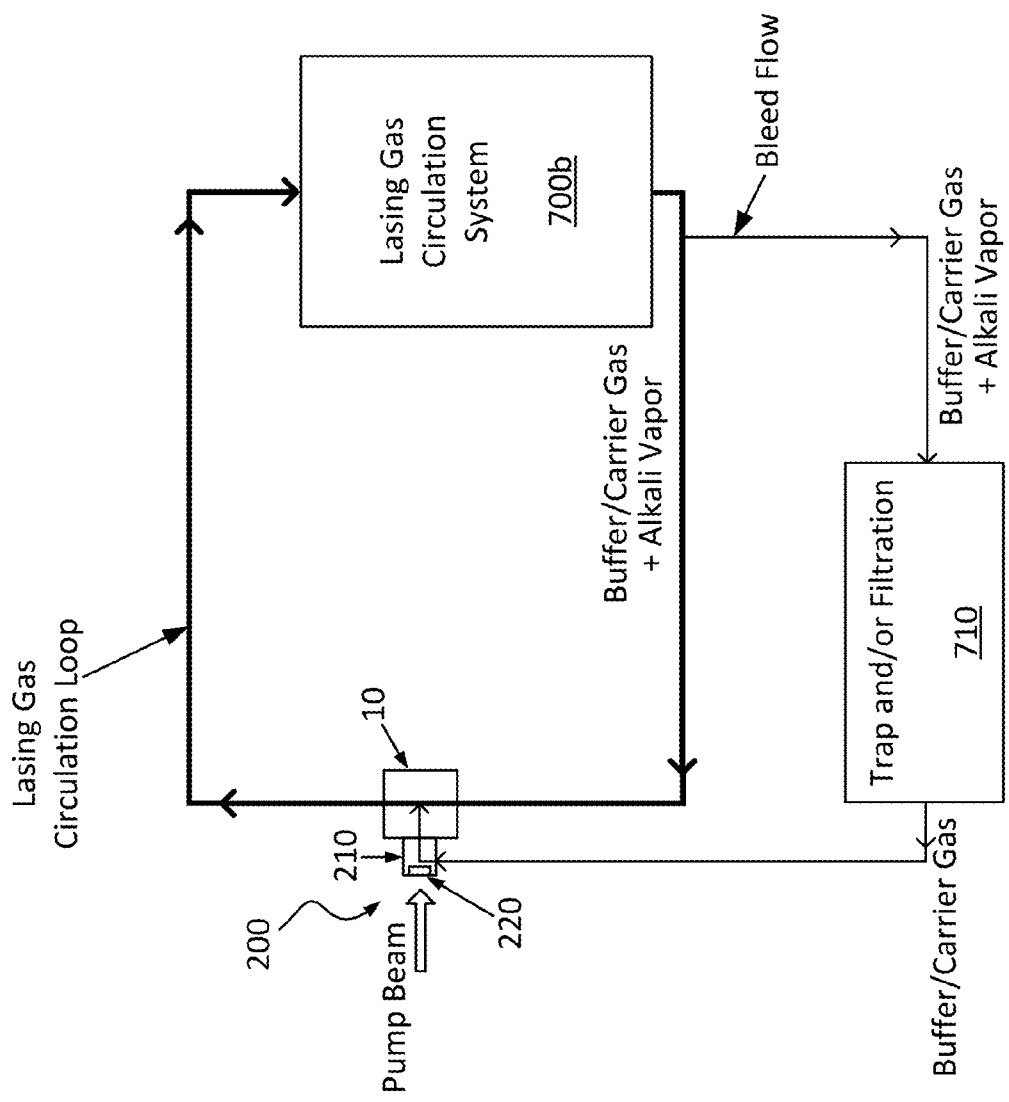
FIG. 8B is a schematic view of an example implementation of a lasing gas circulation system configured in accordance with an embodiment of the present invention.

FIG. 8B is a schematic view of an example implementation of a lasing gas circulation system 700b configured in accordance with an embodiment of the present invention. As can be seen, lasing gas circulation system 700b may be utilized, for example, in the context of a recessed side window assembly 200. As will be appreciated in light of this disclosure, and in accordance with an embodiment, lasing gas circulation system 700b may be configured in much the same way as the lasing gas circulation system 700a discussed above in the context of FIG. 8A. Here, however, the buffer/carrier gas may be delivered to the one or more injectors 230 of recessed side window assembly 200 and can form a gaseous barrier layer, as previously discussed (e.g., in the context of FIG. 4B). Other suitable implementations of lasing gas circulation system 700b will depend on a given application and will be apparent in light of this disclosure.

Figure 9:
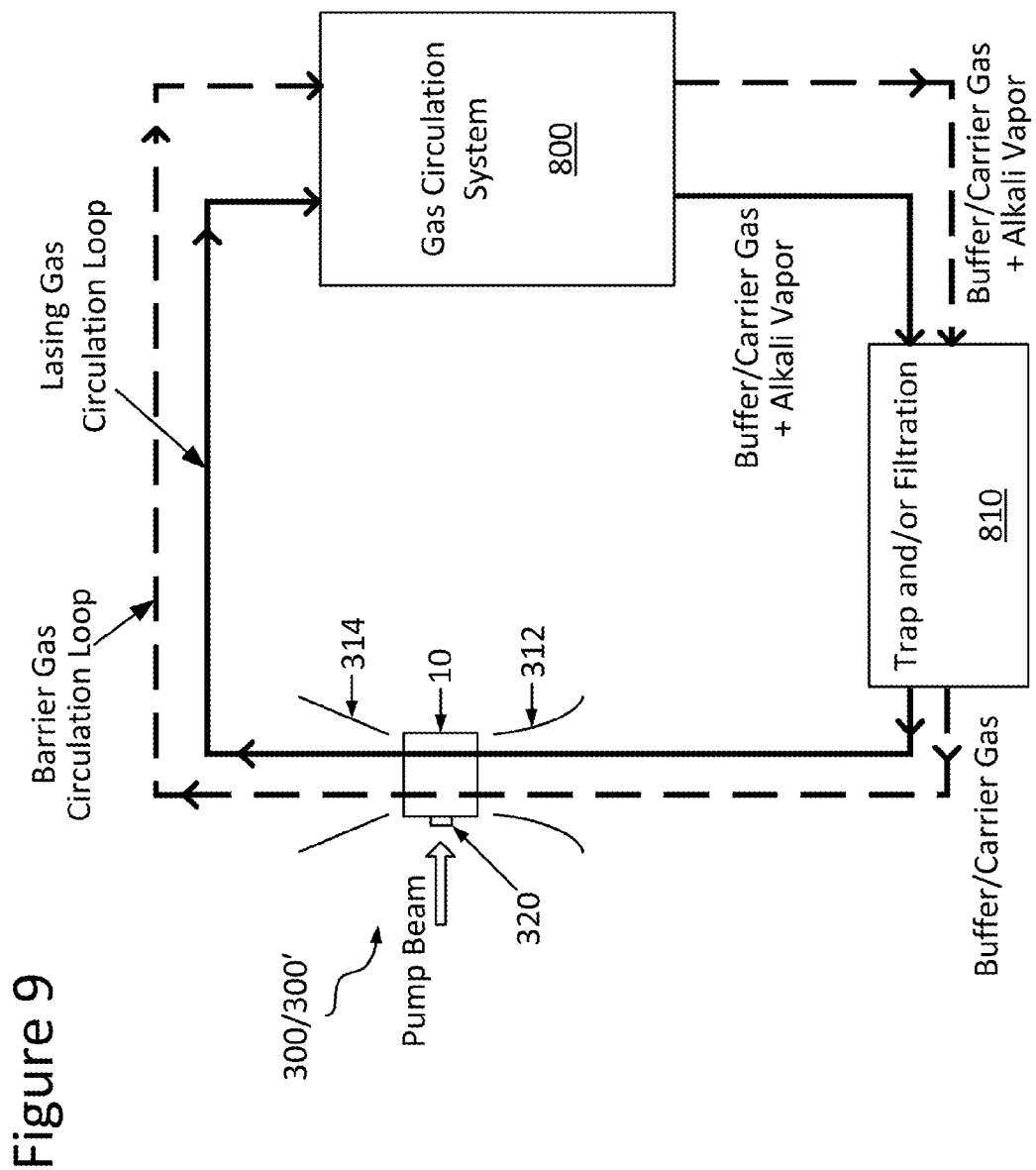
FIG. 9 is a schematic view of an example implementation of a gas circulation system configured in accordance with an embodiment of the present invention.

FIG. 9 is a schematic view of an example implementation of a gas circulation system 800 configured in accordance with an embodiment of the present invention. As can be seen, gas circulation system 800 may be utilized, for example, in the context of a flush side window assembly 300. Gas circulation system 800 may be configured to drive two separate circulation loops: (1) a lasing gas circulation loop (represented by the solid bold line in the figure); and (2) a barrier gas circulation loop (represented by the dashed bold line in the figure). As will be appreciated in light of this disclosure, gas circulation system 800 may include additional, fewer, and/or different elements or components from those here described, and the claimed invention is not intended to be limited to any particular system configurations, but can be used with numerous configurations in numerous applications. For instance, as will be appreciated in light of this disclosure, and in accordance with an embodiment, gas circulation system 800 optionally can be configured to provide a barrier gas bleed flow for an assembly 300', as discussed above with reference to FIGS. 7A-7B.

The lasing gas circulation loop may be operatively coupled with inner conduit 310 and configured: (1) to deliver the lasing gas to the pumping cavity 10, for example, at nozzle portion 312; and (2) to recapture the lasing gas after its transit through pumping cavity 10, for example, at diffuser portion 314. The barrier gas circulation loop may be operatively coupled with outer conduit 360 and configured: (1) to deliver the co-flowing gas to the pumping cavity 10, for example, around nozzle portion 312 of inner conduit 310; and (2) to recapture the co-flowing gas, for example, around diffuser portion 314 of inner conduit 310. In some instances, the barrier gas circulation loop also may be configured to deliver and recapture the bleed flow gas, for example, outside of an outer conduit 360 of an assembly 300' (as previously discussed).

During its transit along the barrier gas circulation loop, the gas that is used as the co-flowing barrier layer (and/or bleed flow layer, if desired) may be directed through a trap and/or filtration component 810, in accordance with an embodiment. Trap and/or filtration component 810 may be configured, for example, to trap or otherwise remove any alkali vapor which may have mixed/leaked from the lasing gas flow into the barrier gas co-flow during the transit between nozzle portion 312 and diffuser portion 314. Also, trap and/or filtration component 810 may be configured to provide the resultant non-alkali buffer/carrier gas for downstream use (e.g., to be used as the co-flowing gaseous barrier layer for flush side window assembly 300 and/or as the bleed flow barrier layer for flush side window assembly 300'). In some cases, trap and/or filtration component 810 may include one or more filters, for example, for filtering out any unwanted substances (e.g., particles, ions, vapors, etc.) which may be produced during the lasing process, thereby maintaining the cleanliness of the non-alkali barrier gas and/or alkali-saturated lasing gas. In some instances, the buffer/carrier gas may be directed through outer conduit 360 to provide the protective co-flow around the lasing gas jet/stream provided by inner conduit 310 and can form a co-flowing gaseous barrier layer, as previously discussed (e.g., in the context of FIGS. 5A-5B and 6A-6B). In some further instances, the buffer/carrier gas may be directed through housing 380 to provide a protective bleed flow around the co-flow of outer conduit 360 to form one or more bleed flow barrier layers, as previously discussed (e.g., in the context of FIGS. 7A-7B). Other suitable implementations of gas circulation system 800 will depend on a given application and will be apparent in light of this disclosure.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system comprising:
    a diode-pumped alkali laser (DPAL) having an optical pumping cavity; and
    a flow assembly optically coupled with the optical pumping cavity, the flow assembly comprising:
        a first conduit having a nozzle portion, a diffuser portion, and a gap there between, wherein the first conduit is configured to deliver a flow of a lasing gas to the optical pumping cavity; and
        a second conduit surrounding the first conduit, wherein the second conduit is configured to deliver a flow of a first non-alkali gas to the optical pumping cavity;
        wherein the flow of the first non-alkali gas circumscribes the flow of the lasing gas.

2. The system of claim 1, wherein the second conduit has an optical window disposed therein, and wherein the flow of the first non-alkali gas forms a protective layer along the optical window to prevent or minimize at least one of chemical attack thereto and/or soot buildup thereon.

3. The system of claim 1, wherein the first non-alkali gas comprises at least one of an inert gas, a noble gas, a hydrocarbon, a fluorocarbon, and/or a combination of any thereof.

4. The system of claim 1 further comprising a housing surrounding the second and first conduits, wherein the housing has an optical window disposed therein and is configured to deliver a flow of a second non-alkali gas which surrounds the flow of the first non-alkali gas, and wherein the flow of the second non-alkali gas forms a protective layer along the optical window to prevent or minimize at least one of chemical attack thereto and/or soot buildup thereon.

5. The system of claim 4, wherein the second non-alkali gas comprises at least one of an inert gas, a noble gas, a hydrocarbon, a fluorocarbon, and/or a combination of any thereof.

6. The system of claim 1, wherein the nozzle portion includes an exit through which the flow of the lasing gas passes to enter the optical pumping cavity, the exit having at least one dimension in the range of about 1 mm to 10 cm.

7. The system of claim 1, wherein the flow of the lasing gas has a flow velocity in the range of about 50-1000 m/s.

8. The system of claim 1, wherein the flow of the lasing gas and the flow of the first non-alkali gas have approximately equal flow velocities.

9. The system of claim 1, wherein the DPAL utilizes at least one of a rubidium (Rb)-based, cesium (Cs)-based, and/or potassium (K)-based lasing gas.

10. The system of claim 9, wherein the first non-alkali gas is the same as a carrier gas for the lasing gas.

11. The system of claim 1, wherein the DPAL has an output power in the range of about 20 kW to 10 MW.

* * * * *